(12) United States Patent
Türke et al.

(10) Patent No.: US 9,216,569 B2
(45) Date of Patent: Dec. 22, 2015

(54) DEVICE FOR OFFLINE INSPECTION AND COLOR MEASUREMENT OF PRINTED SHEETS FOR THE PRODUCTION OF BANKNOTES AND LIKE PRINTED SECURITIES

(75) Inventors: Thomas Türke, Lonay (CH); Harald Heinrich Willeke, Paderborn (DE); Jean-Baptiste Lanternier, Neuvecelle (FR)

(73) Assignee: KBA-NotaSys SA, Lausanne (CH)

( * ) Notice: Subject to any disclaimer, the term of this patent is extended or adjusted under 35 U.S.C. 154(b) by 4 days.

(21) Appl. No.: 14/008,966

(22) PCT Filed: Mar. 27, 2012

(86) PCT No.: PCT/IB2012/051460
§ 371 (c)(1),
(2), (4) Date: Feb. 19, 2014

(87) PCT Pub. No.: WO2012/131581
PCT Pub. Date: Oct. 4, 2012

(65) Prior Publication Data
US 2015/0040785 A1    Feb. 12, 2015

(51) Int. Cl.
*A01H 5/02* (2006.01)
*B41F 33/00* (2006.01)
(Continued)

(52) U.S. Cl.
CPC ............. *B41F 33/0036* (2013.01); *B41F 11/02* (2013.01); *B41F 33/02* (2013.01);
(Continued)

(58) Field of Classification Search
CPC ........ B41F 33/0036; B41F 11/02; G01J 3/50; G01J 3/501; G01J 3/0248; G01J 3/108; G01J 3/463
See application file for complete search history.

(56) References Cited

U.S. PATENT DOCUMENTS 5,163,012 A    11/1992  Wuhrl et al.
5,208,655 A    5/1993   Cox et al.
(Continued)

FOREIGN PATENT DOCUMENTS

DE    295 06 268       6/1995
DE    295 06 268 U1    6/1995
(Continued)

OTHER PUBLICATIONS

International Search Report for PCT/IB2012/051460 mailed Jun. 6, 2012.
(Continued)

*Primary Examiner* — Matthew G Marini
(74) *Attorney, Agent, or Firm* — Nixon & Vanderhye P.C.

(57) ABSTRACT

There is described a device (1) for offline inspection and color measurement of printed sheets for the production of banknotes and like printed securities, comprising (i) a console (10) having a supporting surface (10a) for supporting a sample printed sheet (S), (ii) a multipurpose measuring apparatus (20), which multipurpose measuring apparatus (20) comprises multiple sensors (22, 23) including at least one camera (22) for taking images of selected portions of the sample printed sheet (S) and a color measurement sensor (23) for performing spectrophotometric, colorimetric, and/or densitometric measurements at selected locations on (22, 23) the sample printed sheet (S), (iii) a display (30) for displaying the images taken by the camera (22) and the measurements performed by the color measurement sensor (23), and (iv) a control and processing unit (40) coupled to the multipurpose measuring apparatus (20) and the display (30). The device (1) comprises a move-sensor beam (200) housing the multipurpose measuring apparatus (20), which moveable sensor beam (200) is displaceable along an x-axis over the supporting surface (10a) of the console (10) and over the entire surface of the sample printed sheet (S) located on the supporting surface (10a), the multiple sensors (22, 23) being mounted on a common sensor head (21) which is displaceable within the moveable sensor beam (200) along a y-axis so that the multipurpose measuring apparatus (20) can selectively take images of selected portions of the sample printed sheet (S) by means of the camera (22) or perform measurements at selected locations on the sample printed sheet (S) by means of the color measurement sensor (23). The control and processing unit (40) is configured to control displacement of the moveable sensor beam (200) along the x-axis and of the sensor head (21) along the y-axis.

17 Claims, 21 Drawing Sheets

(51) Int. Cl.
*B41F 33/02* (2006.01)
*G01J 3/02* (2006.01)
*G01J 3/10* (2006.01)
*G01J 3/46* (2006.01)
*G01J 3/50* (2006.01)
*B41F 11/02* (2006.01)

(52) U.S. Cl.
CPC .............. *G01J 3/0248* (2013.01); *G01J 3/108* (2013.01); *G01J 3/463* (2013.01); *G01J 3/50* (2013.01); *G01J 3/501* (2013.01)

(56) References Cited

U.S. PATENT DOCUMENTS

| | | | | |
|---|---|---|---|---|
| 5,225,900 | A | * | 7/1993 | Wright ............................ 358/501 |
| 6,101,939 | A | | 8/2000 | Giori et al. |
| 6,373,573 | B1 | * | 4/2002 | Jung et al. ....................... 356/419 |
| 2004/0213433 | A1 | * | 10/2004 | Noffke et al. ................... 382/112 |
| 2005/0143644 | A1 | * | 6/2005 | Gilad et al. ..................... 600/407 |
| 2008/0087114 | A1 | * | 4/2008 | Engler et al. ................... 73/865.8 |
| 2010/0116164 | A1 | | 5/2010 | Türke et al. |

FOREIGN PATENT DOCUMENTS

| | | |
|---|---|---|
| DE | 296 07 898 | 10/1996 |
| DE | 296 07 898 U1 | 10/1996 |
| DE | 10 2007 030 571 A1 | 2/2008 |
| DE | 10 2007 030571 | 2/2008 |
| DE | 10 2007 041 673 A1 | 1/2009 |
| DE | 10 2007 041673 | 1/2009 |
| EP | 0 949 069 B1 | 10/1999 |
| EP | 2 439 071 A1 | 4/2012 |
| GB | 2 107 047 A | 4/1983 |
| GB | 2 107047 | 4/1983 |
| WO | WO 02/08730 A1 | 2/2002 |
| WO | WO 2007/042919 A2 | 4/2007 |
| WO | WO 2007/105059 A1 | 9/2007 |
| WO | WO 2007/105061 A1 | 9/2007 |
| WO | WO 2007/110317 A1 | 10/2007 |
| WO | WO 2012/049610 A1 | 4/2012 |

OTHER PUBLICATIONS

Written Opinion of the International Searching Authority mailed Jun. 6, 2012.

* cited by examiner

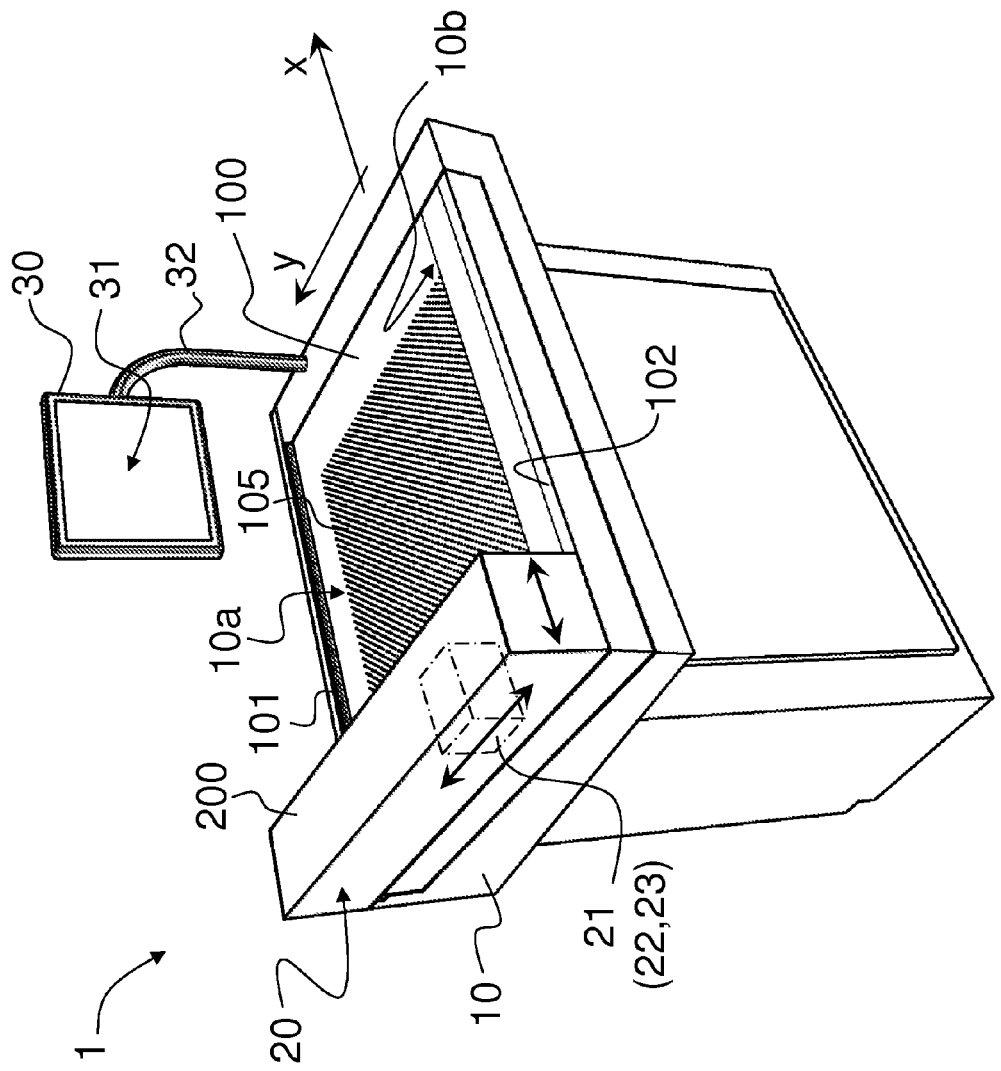

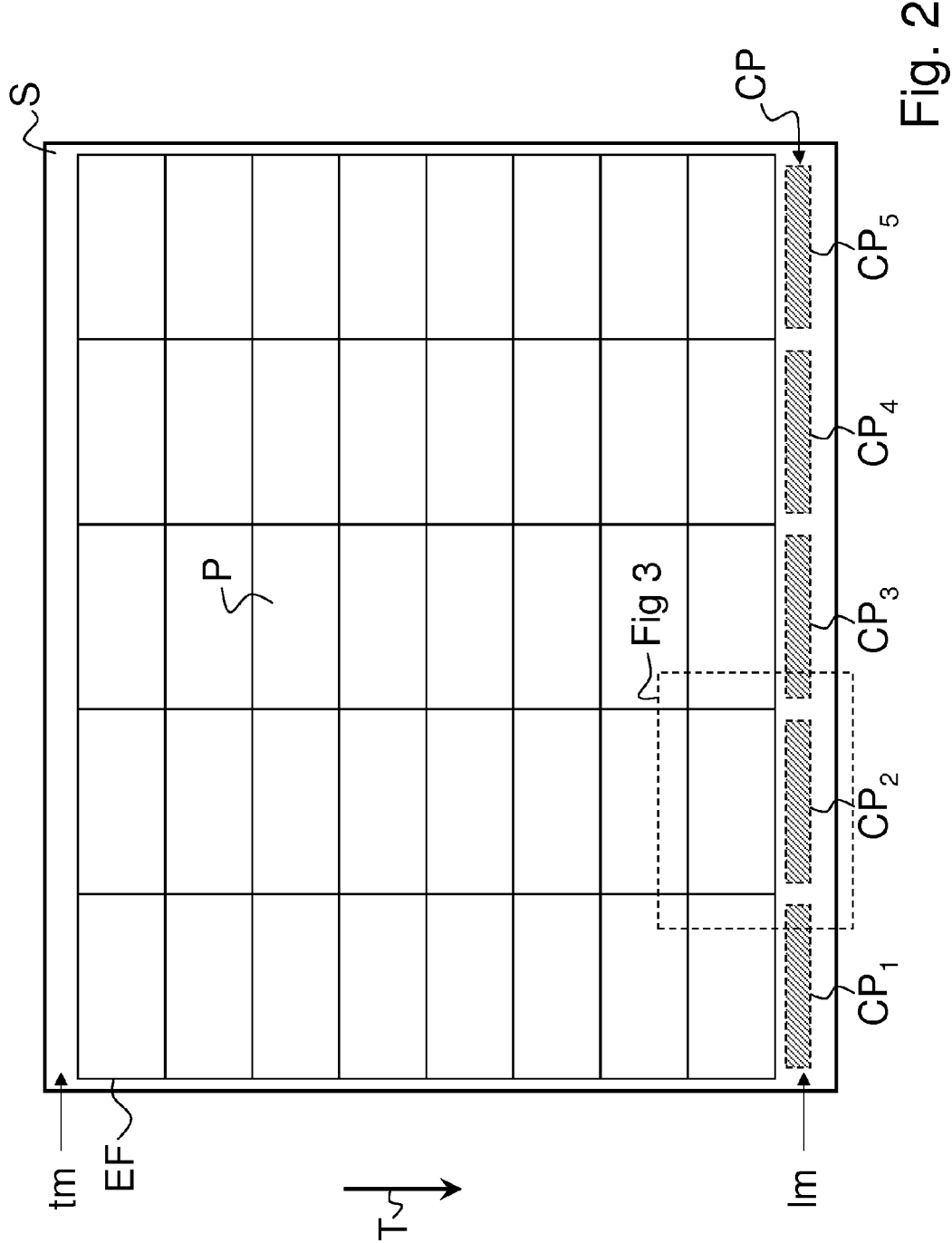

DEVICE FOR OFFLINE INSPECTION AND COLOR MEASUREMENT OF PRINTED SHEETS FOR THE PRODUCTION OF BANKNOTES AND LIKE PRINTED SECURITIES

This application is the U.S. national phase of International Application No. PCT/IB2012/051460 filed 27 Mar. 2012 which designated the U.S. and claims priority to EP 11160542.4 filed 30 Mar. 2011, the entire contents of each of which are hereby incorporated by reference.

TECHNICAL FIELD

The present invention generally relates to a device for offline inspection and color measurement of printed sheets for the production of banknotes and like printed securities.

BACKGROUND OF THE INVENTION

Color measurement systems for performing color measurements of printed sheets and, possibly, automatic adjustment and/or setting of inking units of a printing press are already known as such in the field of commercial printing. Such known systems are typically used in connection with commercial offset printing presses that are used to print various types of commercial products using the well-known four-color CMYK (Cyan-Magenta-Yellow-Key Black) subtractive color model, i.e. by printing multicolor patterns consisting of a combination of halftone raster patterns printed using the four primary colors Cyan, Magenta, Yellow and Black.

International application No. WO 2007/110317 A1 (and corresponding US publication No. US 2010/0116164 A1), which is incorporated herein by reference in its entirety, for instance discloses a method for adjusting an inking unit of a printing press. During a setup phase of the printing press, a small number of sheets are run through the printing press and the resulting printed sheets are inspected by means of a first measuring device (which is not integrated into the printing press), such as a densitometer, color spectrometer or a measuring instrument for combined densitometric and colorimetric measurements. The values measured by the first measuring device are compared to predetermined reference values and adjustments of the inking units of the printing press are made so that the values measured by the first measuring device match as closely as possible the desired reference values. A set of "first actual values" representative of the desired settings are thereby determined and stored as a result of the setup phase and the printing press can be released for production runs. At least a second measuring device is provided downstream of the printing units of the printing press in order to inspect the sheets during production, which second measuring device is installed in the printing press. Such second measuring device is for instance embodied as an in-line inspection system comprising at least one camera system and at least one illumination unit. The camera system is typically a color camera system comprising a line-scan sensor or an array sensor based on CCD or CMOS technology. The illumination unit typically comprises light-emitting diodes, or LEDs, or like illumination elements. The second measuring device records an image of at least one, preferably of all of the sheets which are printed on the printing press and converts the recorded images to digital image data which is fed to an image processing system as a set of "second actual values". During a learning phase, the set of "second actual values" is measured and stored as reference values for controlling an adjustment unit which adjusts the inking units of the printing press. Upon completion of the learning phase, all further printed products which are produced on the printing press are evaluated on the basis of the reference values that were established during the learning phase and any deviation between the reference values and the measured values which exceeds an acceptable tolerance is corrected by means of the adjustment unit.

According to WO 2007/110317 A1, measurements are typically made on at least one measuring strip (or "color control strip") that forms part of the patterns printed on the sheets, which measuring strip is typically located in a margin of the sheet, such as the margin at the leading edge of the sheet, outside the effective printed region of the sheet where the actual prints are carried out.

Known solutions as above are used for performing color measurements in commercial offset printing presses, i.e. printing presses of the type based on four-color composite printing using the CMYK subtractive color model. Printing presses of this type comprises at least four distinct printing towers which are each designed to print one of the four primary colors. Additional printing towers may be provided to print special colors and/or for the purpose of coating the printed substrates.

These solutions are satisfactory as far as applications to commercial offset printing presses are concerned and basically require the use of a rather simple color control strip comprising a plurality of color control fields representative of the relevant primary colors that are printed (i.e. Cyan, Magenta, Yellow, Black) and, possibly, simple combinations thereof (e.g. Blue/Cyan+Magenta, Red/Magenta+Yellow, and Green/Cyan+Yellow) and/or additional special colors.

In contrast to commercial (offset) printing, security printing (as applied for instance for the production of banknotes and like printed securities) is not based on the use of a four-color printing process relying on the CMYK subtractive color model. Rather, solid patterns are printed using different printing inks of the desired colors (i.e. a blue pattern is printed using a blue printing ink, a brownish pattern using a brownish ink, a copper-like pattern using a copper-colored printing ink, etc.).

Typical color control strips as used in commercial printing are not suitable for security printing applications for the purpose of measuring the printed colors, even less for the purpose of automatically controlling the ink supply. There was therefore a need for a new and improved solution which could suitably cope with the specific requirements of security printing. A solution to this problem has been proposed by the present Applicant in European patent application No. 10187099.6 of Oct. 11, 2010 entitled "COLOR CONTROL PATTERN FOR THE OPTICAL MEASUREMENT OF COLORS PRINTED ON A SHEET-LIKE OR WEB-LIKE SUBSTRATE BY MEANS OF A MULTICOLOR PRINTING PRESS AND USES THEREOF" (to be published as European patent application No. EP 2 439 071 A1), which application is incorporated herein by reference in its entirety.

European patent application No. 10187099.6 especially relates to a color control pattern as generally illustrated in FIGS. 2 to 4 of the instant application, namely a color control pattern CP for the optical measurement of colors printed on a sheet S (or web) by means of a multicolor printing press, especially by means of a multicolor security printing press, which sheet S exhibits an effective printed region EF having a multicolor printed image comprising a plurality of juxtaposed colored areas A-H printed with a corresponding plurality of printing inks of different colors, wherein the color control pattern CP is printed in a margin portion lm of the sheet S next to the effective printed region EF. Such color control pattern CP comprises one or more color control strips a-d extending transversely to a direction of transport T of the printed sheet S, each color control strip a-d comprising a plurality of distinct color control fields CF, $CF_A$ to $CF_H$ consisting of printed fields of each relevant printing ink that is printed in the effective printed region EF. These color control fields CF, $CF_A$ to $CF_H$ are coordinated to actual usage of the relevant printing inks in the effective printed region EF and are positioned transversely to the direction of transport T of the sheet S at locations corresponding to actual positions where the relevant printing inks are applied in the effective printed region EF.

Preferably, the effective printed region EF consists of a matrix of individual multicolor prints P, especially multicolor security prints, arranged in multiple rows and columns and the color control pattern CP comprises an individual color control pattern $CP_i$, $CP_1$ to $CP_5$ for each column of individual multicolor prints P. All such individual color control patterns $CP_i$, $CP_1$ to $CP_5$ are preferably identical.

Advantageous designs of the color control pattern CP are further discussed in European patent application No. 10187099.6.

European patent application No. 10187099.6 further relates to a color measurement system comprising an optical measurement system for measuring the colors printed on the sheet S, wherein measurement of the printed colors by the optical measurement system is carried out in a color control pattern CP as defined above.

The above-defined color control pattern CP (and color measurement system) can advantageously be used for the purpose of:

(i) performing in-line color measurements in a multicolor printing press, especially in a multicolor security printing press, or for performing offline color measurements (i.e. outside of the multicolor printing press); and, possibly, (ii) automatically adjusting and/or setting inking units of the multicolor printing press.

Offline inspection and color measurement of printed matter is known as such in the art. In contrast to in-line inspection which is carried out, usually, on each and every sheet processed in a printing press, offline inspection is typically carried out to perform a so-called statistical process control (SPC) of the production, i.e. by taking sample printed sheets out of the production and checking such sample printed sheets to possibly identify deviations in the printing quality. Statistical process control (SPC) is typically carried out in commercial printing as discussed in the above-identified patent publications and generally consists in performing spectrophotometric, colorimetric and/or densitometric measurements in color control strips or fields provided next to the effective printed region of the sheets. Spectrophotometric or colorimetric measurements (i.e. measurements of the spectral distribution of printed colors) are typically carried out by means of a spectrophotometer or spectrocolorimeter. Densitometric measurements (i.e. measurements of the optical density of or degree of light reflected from—the printed colors) are typically carried out by means of a densitometer.

An example of a device for color measurement of printed sheets comprising a densitometer head mounted on an arm which is moveable along an x-axis over a sample printed sheet, which densitometer head is moveable on the arm along a y-axis is disclosed in U.S. Pat. No. 5,208,655.

International application No. WO 02/08730 A1 discloses a device for color measurement of printed sheets comprising a spectrophotometer mounted on a x-y table so as to be able to be positioned at any desired location over a sample printed sheet, wherein a camera is further provided to capture an image of the entire sample printed sheet. The image of the sheet is processed according to a pattern recognition technique in order to identify areas on the sample printed sheet where the spectrophotometer is positioned to perform color measurements.

U.S. Pat. No. 5,163,012 discloses a quality control system for quality control of printed sheets, which quality control system in particular combines a video camera adapted to capture an image of the entire surface of a sample printed sheet and a color measurement device (such as a densitometer or colorimeter) that can be moved manually by an operator over the surface of the sample printed sheet to perform color measurements at desired locations on the sample printed sheet. The color measurement device is provided with a marking that is imaged by the video camera so as to ensure that the appropriate measurement is being taken at the correct place.

Further examples are disclosed in publications DE 10 2007 041 673 A1, DE 295 06 268 U1, DE 10 2007 030 571 A1, GB 2 107 047 A and DE 296 07 898 U1.

The above known solutions are reasonably satisfactory to the extent that they can be adequately used in commercial printing. Such known solutions are however inadequate when it comes to inspecting and performing color measurements on printed sheets as used for the production of banknotes and liked printed securities. In such applications, the operator or printer not only needs to ensure proper printing quality in terms of the colorimetry and density of the visible colors that are applied on the printed sheets, but also needs to ensure high printing quality. In particular, the printer has to ensure that all security features that are to be applied on the printed sheets are properly printed on the sheets, including but not limited to invisible features that are only visible under certain illumination conditions, such as infrared or ultraviolet illumination.

There is therefore a need for an improved solution which enables the printer to adequately check all relevant features that are to be printed on the sheets.

SUMMARY OF THE INVENTION

A general aim of the invention is therefore to improve the known devices for offline inspection and color measurement of printed sheets.

In particular, an aim of the present invention is to provide a solution that is more adapted to the specific requirements of security printing.

More specifically an aim of the present invention is to provide such a solution that permits not only optimal measurement of the colors printed on the sheets but also a detailed inspection of all features printed on the sheets.

Still another aim of the present invention is to provide such a solution that is convenient and easy to use by a printer.

These aims are achieved thanks to the solution defined in the claims.

More precisely, there is provided a device for offline inspection and color measurement of printed sheets for the production of banknotes and like printed securities, comprising:

a console having a supporting surface for supporting a sample printed sheet;

a multipurpose measuring apparatus, which multipurpose measuring apparatus comprises multiple sensors including at least one camera for taking images of selected portions of the sample printed sheet and a color measurement sensor for performing spectrophotometric, colorimetric, and/or densitometric measurements at selected locations on the sample printed sheet;

a display for displaying the images taken by the camera and the measurements performed by the color measurement sensor; and a control and processing unit coupled to the multipurpose measuring apparatus and the display.

The device of the invention further comprises a moveable sensor beam housing the multipurpose measuring apparatus, which moveable sensor beam is displaceable along an x-axis over the supporting surface of the console and over the entire surface of the sample printed sheet located on the supporting surface, the multiple sensors being mounted on a common sensor head which is displaceable within the moveable sensor beam along a y-axis so that the multipurpose measuring apparatus can selectively take images of selected portions of the sample printed sheet by means of the camera or perform measurements at selected locations on the sample printed sheet by means of the color measurement sensor, the control and processing unit being configured to control displacement of the moveable sensor beam along the x-axis and of the sensor head along the y-axis.

Thanks to this solution, a detailed inspection of the visible (and possibly invisible) features printed on the sheets as well as desired color measurements can be performed in a substantially more convenient, easier and faster way.

In addition, by mounting the camera and color measurement sensor on a common sensor head, located in close proximity to the sample printed sheet, highly detailed images and precise color measurements can be carried out, while guaranteeing an accurate positioning of both sensors over the sample printed sheet with one and a same positioning system.

Furthermore, the combination of a camera and of a color measurement system on a common sensor head opens the door for further simplification and optimization of the tasks to be performed by the printer.

In particular, according to an advantageous embodiment of the invention, the display is preferably a touch-screen display with a touch-sensitive area configured to act as input of the control and processing unit for positioning of the moveable sensor beam and of the sensor head over the sample printed sheet. In this way, the printer or operator can easily and quickly operate the device to inspect or perform measurements in any desired portion or location of the sample printed sheet. This can in particular be put to advantageous use in the context of security printing where the printed sheets exhibit an effective printed region consisting of a matrix of individual multicolor security prints arranged in multiple rows and columns (see e.g. FIG. 2). In this case, the control and processing unit and the touch-sensitive area of the display can be configured to allow positioning of the moveable sensor beam and of the sensor head on any desired one of the individual multicolor security prints or any portion thereof upon selection on the touch-screen display.

According to a further refinement of this advantageous embodiment of the invention, the touch-screen display can further be configured to act as interface for controlling operation of the multipurpose measuring apparatus and switching the multipurpose measuring apparatus between various operating modes, including at least one image acquisition mode where the camera is activated to take images of selected portions of the sample printed sheet and at least one color measuring mode where the color measurement sensor is activated to perform measurements at selected locations on the sample printed sheet.

According to another embodiment of the invention, the camera is capable of taking images of selected portions of the sample printed sheet under white visible light, under infrared (IR) light, and under ultraviolet (UV) light and an operating mode of the camera is switchable selectively between a visible light operating mode, an infrared operating mode, and an ultraviolet operating mode. In that context, the multipurpose measuring apparatus conveniently further comprises multiple light sources which are activated individually in dependence of the operating mode of the camera, including a first light source for illuminating the sample printed sheet with white light, a second light source for illuminating the sample printed sheet with infrared (IR) light, and a third light source for illuminating the sample printed sheet with ultraviolet (UV) light.

According to yet another embodiment of the invention, a position and/or a rotation of the sample printed sheet is determined automatically during an initialisation phase by means of the camera. This is advantageous in that an exact positioning of the sample printed sheet is not required, operation of the multipurpose measuring apparatus being automatically adjusted to the actual positioning of the sample printed sheet. In this context, rotation of the sample printed sheet within a certain tolerance can be compensated for by an adjustment of the y-position of the images taken by the camera as the moveable sensor beam moves along the x-axis.

According to a further advantageous embodiment of the invention, and in the context of a sample printed sheet exhibiting an effective printed region consisting of a matrix of individual multicolor security prints arranged in multiple rows and columns, and a color control pattern printed in a margin portion of the sample printed sheet next to the effective printed region, which color control pattern comprises an individual color control pattern for each column of individual multicolor security prints, the control and processing unit can be configured to control the camera to automatically scan and take an image of each individual color control pattern.

According to yet another embodiment of the invention, the control and processing unit can be configured to control the camera to automatically capture an image of and identify color control fields provided on the sample printed sheet, which color control fields are indicative of the various inks applied on the sample printed sheet during printing. In this context, the control and processing unit can in particular be configured to control the color measurement sensor to perform automated color measurements in the color control fields thus identified.

By predefining defined colors corresponding to the various inks applied on the sample printed sheet and in the color control fields and inputting these predefined colors to the control and processing unit, during a setup phase, such defined colors can advantageously be assigned to corresponding inking units of the printing press that was used to print the sample printed sheet. Preferably the control and processing unit is further configured to automatically assign these defined colors to corresponding color control fields based on pre-press data of the sample printed sheet or based on measurements carried out in the color control fields by means of the multipurpose measuring apparatus. In this way, setting up of the necessary parameters to effect an automated control and setting of the inking units of the printing press in greatly simplified and made quicker.

Further advantageous embodiments of the invention form the subject-matter of the dependent claims and are discussed below.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which:

FIG. 1 is a schematic perspective view of a device according to a preferred embodiment of the invention;

FIG. 2 is a schematic illustration of a sample printed sheet which bears a color control pattern for the optical measurement of the printed colors in accordance with a preferred embodiment of the invention discussed in European patent application No. 10187099.6;

FIGS. 5a-5m are various views illustrating a graphical user interface (GUI) of the device of FIG. 1 making use of a touch-screen display with a touch-sensitive area.

DETAILED DESCRIPTION OF EMBODIMENTS OF THE INVENTION

Figure 6:
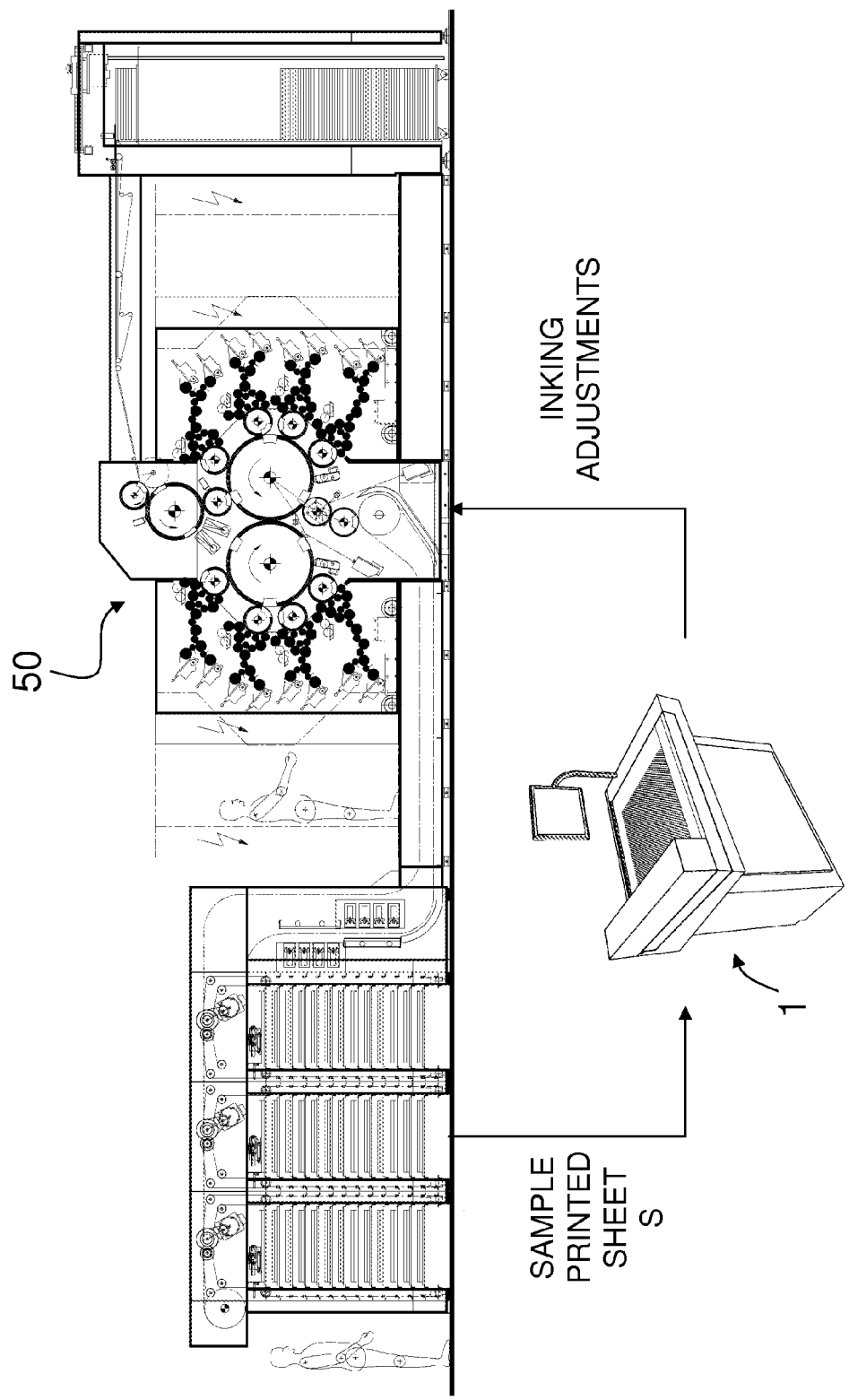
FIG. 6 is a schematic diagram of a possible closed-loop color (ink) control system making use of the device of FIG. 1 for the automatic adjustment and setting of the inking units of a printing press.

The invention will be described hereinafter in the context of the printing of sheets by means of a sheet-fed offset printing press for the simultaneous recto-verso printing of sheets for the production of banknotes and like printed securities (see e.g. FIG. 6). Such a security printing press, which is commonly referred to in the art as a "Simultan-type" security printing press, is already described in International application No. WO 2007/105059 A1 (and corresponding US publication No. US 2009/0025594 A1), which publication is incorporated herein by reference in its entirety. Further information about such printing presses is also disclosed in European patent No. EP 0 949 069 B1 (and corresponding U.S. Pat. No. 6,101,939) and International applications Nos. WO 2007/042919 A2 (and corresponding US publication No. US 2008/0271620 A1) and WO 2007/105061 A1 (and corresponding US publication No. US 2009/0007807 A1). All of the above listed applications are incorporated herein by reference in their entirety. Such Simultan-type printing presses are sold by the instant Applicant under the registered trademark "Super Simultan®".

A preferred embodiment of the device of the invention will now be described in reference to FIGS. 1 and 1a-1c.

Figure 1A:
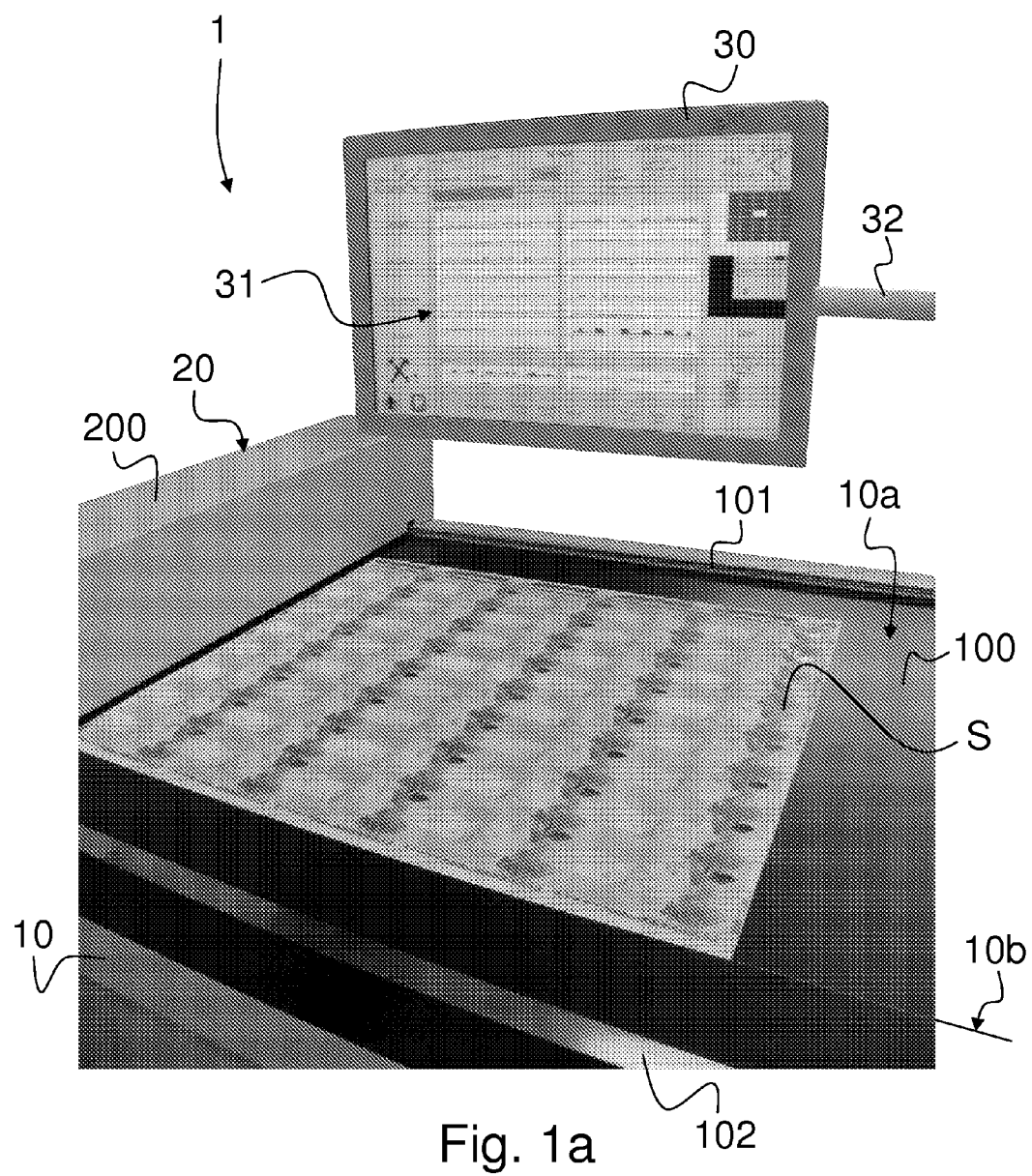
FIG. 1a is a photograph of the device of FIG. 1 showing a sample printed sheet located on the device for inspection and color measurements.
Figure 1B:
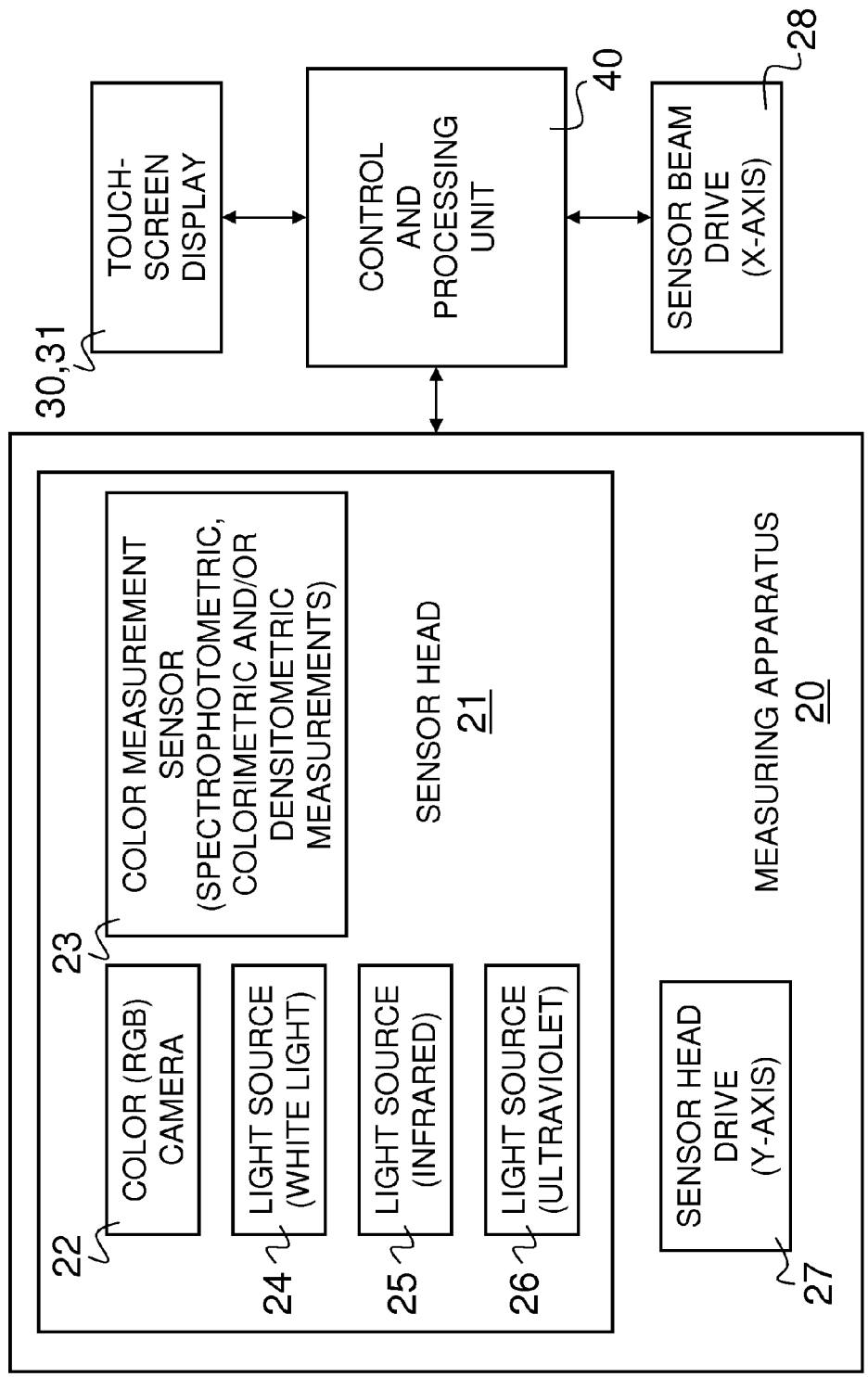
FIG. 1b is a schematic diagram of the main functional components of the device of FIG. 1.
Figure 1C:
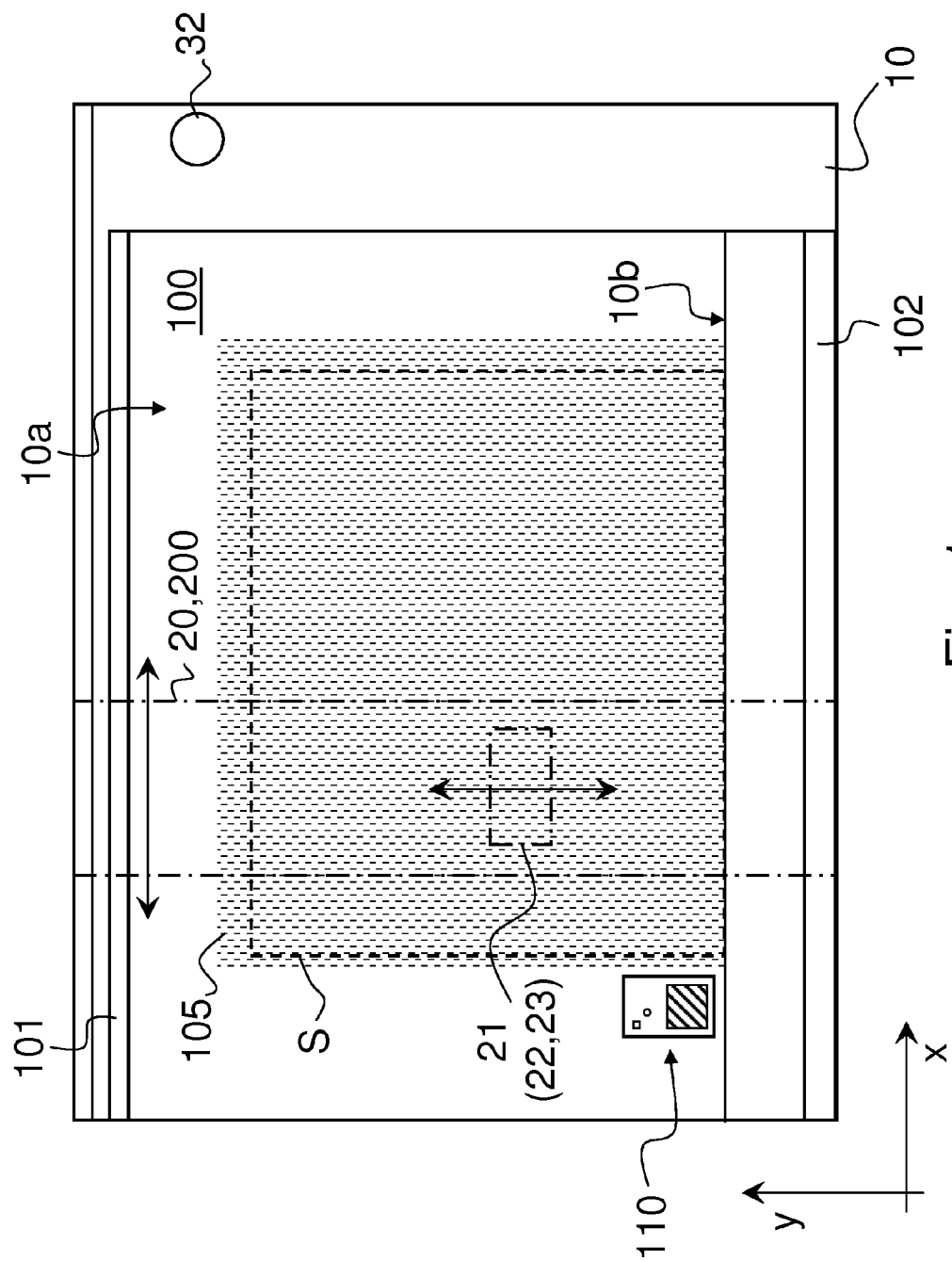
FIG. 1c is a plan view of the surface of the device of FIG. 1 where the sample printed sheet is located.

FIG. 1 shows a perspective view of a device for offline inspection and color measurement of printed sheets according to a preferred embodiment of the invention, which device is generally designated by reference numeral 1 in the drawings. This device comprises a console 10 having a supporting surface 10a for supporting a sample printed sheet S. Such a sample printed sheet S is not shown in FIG. 1, but appears in the photograph of FIG. 1a and is schematically depicted in FIG. 1c. The console 10 preferably comprises a suction table 100 (whose upper surface forms the supporting surface 10a) with a plurality of suction apertures 105 designed to hold the sample printed sheet S against the supporting surface 10a by aspiration.

Reference numeral 10b in FIGS. 1, 1a and 1c designates a reference edge against which an edge of the sample printed sheet S is placed so as to ensure an adequate alignment of the edges of the sample printed sheet S on the supporting surface 10a with respect to x and y axes.

The device 1 further comprises a multipurpose measuring apparatus 20 with multiple sensors including at least one camera 22 for taking images of selected portions of the sample printed sheet S and a color measurement sensor 23 for performing spectrophotometric, colorimetric and/or densitometric measurements at selected locations on the sample printed sheet S. The camera 22 is preferably a color camera (advantageously an RGB camera), while the color measurement sensor 23 preferably combines a spectrophotometer or spectrocolorimeter for performing spectrophotometric or colorimetric measurements and a densitometer for performing optical density measurements on the sample printed sheet S.

According to the invention the sensors 22, 23 are jointly disposed in close proximity to the surface of the sample printed sheet S where images are to be captured or color measurements are to be carried out.

As this will be discussed hereinafter, the camera 22 is advantageously exploited to allow a detailed inspection of selected portions of the sample printed sheet S and to perform additional tasks, including, according to this preferred embodiment, determination of the actual positioning of the sample printed sheet S on the supporting surface 10a and the identification of color control fields provided on the sample printed sheet S where color measurements are to be carried out by means of the color measurement sensor 23. The color measurement sensor 23 can also be used to carry out color measurements at any desired location on the sample printed sheet S.

According to the invention, both the camera 22 and the color measurement sensor 23 are mounted on a common sensor head 21 schematically illustrated in FIGS. 1, 1b and 1c, which sensor head 21 is displaceable along a y-axis. More exactly, a moveable sensor beam 200 is provided, which moveable sensor beam 200 houses the multipurpose measuring apparatus 20 and is displaceable along the x-axis over the supporting surface 10a of the console 10 and over the entire surface of the sample printed sheet S, the sensor head 21 (and associated sensors 22, 23) being located (and moveable) within the moveable sensor beam 200. In this way, the multipurpose measuring apparatus 20 can selectively take images of selected portions of the sample printed sheet S by means of the camera 22 or perform measurements at selected locations on the sample printed sheet S by means of the color measurement sensor 23.

As schematically illustrated in FIG. 1b, the sensor head 21 further supports multiple light sources 24, 25, 26 which can be activated individually in dependence of an operating mode of the camera 22 (as this will be discussed hereinafter in reference to FIGS. 5f to 5k). Such light sources in particular include a first light source 24 for illuminating the sample printed sheet S with white (visible) light, a second light source 25 for illuminating the sample printed sheet S with infrared (IR) light, and a third light source 26 for illuminating the sample printed sheet S with ultraviolet (UV) light. The second light source 25 may in particular be used to illuminate and visualize infrared-absorbing patterns or elements provided on the sample printed sheet S, such a watermarks, security threads, infrared-absorbing ink layers, etc. The third light source 26 may in particular be used to illuminate fluorescent or phosphorescent patterns or elements provided on the sample printed sheet S, which patterns or elements are responsive to the ultraviolet illumination by producing a characteristic optical response in the visible spectrum. It will therefore be understood that the camera 22 shall preferably be sensitive to illumination in the infrared (or near-infrared) region of the spectrum in addition to its sensitivity over the whole or substantially the whole visible spectrum.

As this can be recognized in the illustrations of FIGS. 1 and 1a, the moveable sensor beam 200 advantageously forms a longitudinal arm that is located in close proximity to the supporting surface 10a, a spacing between the moveable sensor beam 200 and the supporting surface 10a being kept at a minimum (i.e. a couple of millimeters). Furthermore, the sensor head 21 and multiple sensors 22, 23 (and associated light sources 24, 25, 26) are completely encased within the moveable sensor beam 200 so as to leave only a lower opening in the moveable sensor beam 200 which is oriented towards the supporting surface 10a and the sample printed sheet S located thereon. In this way, and in contrast for instance to the solution disclosed in DE 10 2007 041 673 A1, optimal inspection and measuring conditions are guaranteed and inspection or color measurements on the sample printed sheet S are not affected by ambient light of the surrounding environment. This also ensures proper operation of the camera 22 when operating in the infrared or ultraviolet operating modes.

Operation of the multipurpose measuring apparatus 20 as well as displacement of the sensor beam 200 and of the sensor head 21 are controlled by a control and processing unit 40 (see FIG. 1b), which can be based on any adequate control and processing technology. This control and processing unit 40 can in particular be suitably configured as a PC-based system with a Windows operating software (or the like) cooperating with adequate supply, control and drive systems for supplying power to and controlling operation of the device 1, including to the drive systems used for positioning of the multipurpose measuring apparatus 20. As schematically illustrated in FIG. 1b, the control and processing unit 40 is in particular coupled to the multipurpose measuring apparatus 20, to a sensor head drive 27 to control positioning of the sensor head 21 along the y-axis, and to a sensor beam drive 28 to control positioning of the sensor beam 200 along the x-axis. While this is not specifically illustrated in FIG. 1b, it should be understood that the control and processing unit 40 may further be coupled to other functional components of the device 1. This is in particular includes a coupling to the suction system of the suction table 100 to control activation or deactivation of the aspiration of the sample printed sheet S against the supporting surface 10a.

As schematically illustrated in FIG. 1b, the control and processing unit 40 is further coupled to a display 30, which display is in particular used for displaying the images taken by the camera 22 and the measurements performed by the color measurement sensor 23. According to this preferred embodiment, the display 30 is preferably a touch-screen display having a touch-sensitive area 31 acting as input of the control and processing unit 40 for positioning of the moveable sensor beam 200 and of the sensor head 21 over the sample printed sheet S. In this particular instance, a mounting arm 32 is provided to mount the display 30 on the console 10.

Displacement of the sensor head 21 and of the sensor beam 200 can be ensured using any adequate drive and guiding system. A linear drive can for instance conveniently be used to ensure displacement of the sensor head 21 within the sensor beam 200 along the y-axis. Driving of the sensor beam 200 along the x-axis can for instance be performed by means of a motor driving the sensor beam 200 via toothed belts and gears. An appropriate guiding of the sensor beam 200 along the x-axis is ensured in this particular instance by means of a guiding rail 101 provided at a rear portion of the suction table 100, which guiding rail 101 guides a rear end of the sensor beam 200, and a guide surface 102 provided at a front portion of the suction table 100, which guide surface 102 provides support and guidance of a front end of the sensor beam 200.

As schematically illustrated in FIG. 1c, a calibration pattern 110 is preferably provided on the supporting surface 10a for calibration of the multiple sensors 22, 23 of the multipurpose measuring apparatus 20. Such calibration is in particular useful to adequately calibrate the geometrical properties of the camera 22 (and possibly correct optical aberrations) and calibrate reference values (including white balance) of the color measurement sensor 23.

While reference is made hereinabove to one camera 22, more than one camera may be provided if necessary or adequate. The camera 22 may furthermore be a line-scan camera or an array camera based on CCD or CMOS technology (or any other suitable imaging technology). Similarly, additional sensors might be provided on the sensor head 21, for instance a magnetic sensor. In this particular embodiment, the sensor head 21 is configured to allow mounting of up to four sensors having a generally similar mechanical configuration.

FIG. 2 is a schematic illustration of a sample printed sheet S as used for the production of banknotes and like printed securities, which sample printed sheet S bears a color control pattern, designated generally by reference CP, for the optical measurement of the colors printed on the sample printed sheet S in accordance with the subject-matter of European patent application No. 10187099.6 discussed in the preamble hereof.

As shown in FIG. 2, the sheet S exhibits an effective printed region EF where the desired multicolor patterns are printed. This effective printed region EF does not cover the whole surface of the sheet S and is surrounded by margin portions on all four sides. While this is not specifically illustrated in FIG. 2, patterns may be printed in the sheet margins for various purposes, including sheet marking and identification purposes as well as for the purpose of performing color control measurements.

FIG. 2 shows that the color control pattern CP is printed in a leading margin portion lm of the sheet S (i.e. at the leading edge of the sheet with respect to the direction of transport of the sheet shown by arrow T in FIG. 2) next to the effective printed region EF. The color control pattern CP may alternatively be provided in the trailing margin portion tm of the sheet S.

In the example shown in FIG. 2, the effective printed region EF consists of a matrix of individual multicolor security prints P, such as banknote prints, which are arranged in multiple rows and columns. In this example, the effective printed region EF actually consists of five columns and eight rows of individual prints P (all prints P bearing identical printed patterns), i.e. a total of forty prints P. This particular matrix arrangement is obviously purely illustrative.

As further illustrated in FIG. 2, the color control pattern CP extends transversely to the direction of transport T of the sheet S and comprises, in this preferred embodiment, an individual color control pattern $CP_1$, $CP_2$, $CP_3$, $CP_4$, $CP_5$ for each one of the five columns of individual multicolor security prints P. According to this preferred embodiment, all individual color control patterns $CP_1$ to $CP_5$ are identical. The individual color control patterns $CP_1$ to $CP_5$ may however defer from one another depending on the relevant subdivision of ink zones.

In the context of the present invention, it shall be understood that the device 1 is adapted to take an image of any desired portion of the sample printed sheet S, including the effective printed region EF and the color control pattern CP. For the purpose of color measurement (and possibly automatic regulation of inking units of a printing press), it may however suffice to take only an image of the portion of the sheet S where the color control pattern CP is printed. It will also be appreciated that a color control pattern CP would in practice be provided on both sides of the sheets S.

Figure 3:
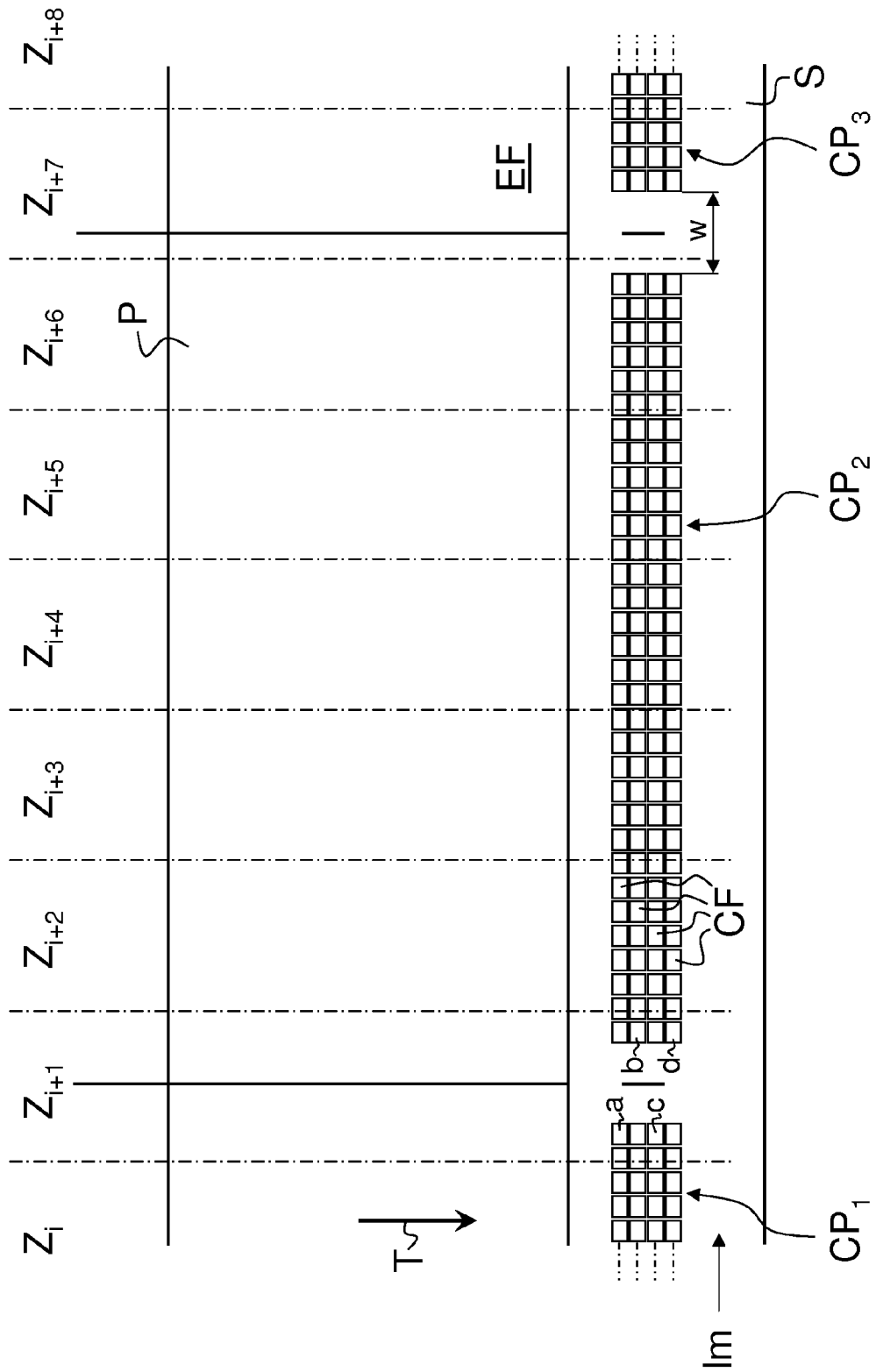
FIG. 3 is an enlarged schematic illustration of the sample printed sheet of FIG. 2 showing an individual color control pattern forming part of the color control pattern.

FIG. 3 is a detailed view of one of the individual color control patterns $CP_1$ to $CP_5$ of FIG. 2, namely of individual color control pattern $CP_2$ (as schematically indicated by the dashed rectangle in FIG. 2). Portions of the adjacent color control patterns $CP_1$ and $CP_3$ are also visible in FIG. 3.

As shown in greater detail in FIG. 3, the color control pattern CP preferably comprises four distinct color control strips a, b, c, d which extend transversely to the direction of transport T of the printed sheet S (which configuration is reflected in the individual color control patterns $CP_1$ to $CP_5$), each color control strip a-d comprising a plurality of distinct color control fields CF consisting of printed fields of each relevant printing ink that is printed in the effective printed region EF.

In this particular example, and for the sake of illustration only, each individual color control pattern consists of up to thirty-two color control fields CF along each color control strip a, b, c, d, i.e. a total of hundred and twenty-eight color control fields CF are provided in each individual color control pattern. These color control fields CF are coordinated to the actual usage of the relevant printing inks in the effective printed region EF and are positioned transversely to the direction of transport T of the sheet S at locations corresponding to the actual positions where the relevant printing inks are applied in the effective printed region EF. The number of color control fields CF is purely illustrative and actually depends on various factors, including the length (transversely to the direction of transport T) of each individual print and the dimensions of each color control field CF.

In the particular example of FIGS. 2 and 3, it may be appreciated that each individual color control pattern $CP_1$ to $CP_5$ (and the color control fields CF thereof) is positioned in dependence of the actual design printed in the effective region EF, i.e. in dependence of each column of individual prints P.

According to the embodiment shown in FIGS. 2 and 3, one may further appreciate that the individual color control patterns $CP_1$ to $CP_5$ are separated from one another by an unprinted region where the columns of individual multicolor security prints P adjoin. This unprinted region preferably has a minimum width w of 5 mm. This is in essence useful in that the sheets S are ultimately cut column-wise and row-wise to form individual security documents, such as banknotes, and in that the unprinted region between the individual color control patterns $CP_1$ to $CP_5$ are preferably exploited for the provision of reference marks for the cutting process. These reference marks may also be used for the purpose of measuring registration between the various colors. The color control pattern CP may however extend quasi continuously along substantially the whole width of the sheet S if this is useful or necessary.

In FIG. 3, one has further depicted by dash lines the corresponding subdivision in a plurality of adjoining ink zones $Z_i, Z_{i+1}, Z_{i+2}, \ldots$, transversely to the direction of transport T of the sheet S. These ink zones $Z_i, Z_{i+1}, Z_{i+2}, \ldots$, illustrate the relevant positions where ink is supplied in the corresponding inking units of the printing press and where ink adjustments can be made. Nine ink zones are depicted in FIG. 3, but it should be appreciated that each inking unit comprises a greater number of such ink zones, typically of the order of thirty.

It may be appreciated that the color control pattern CP is not designed in accordance with the ink zone subdivision, but in accordance with the actual printed image that is printed in the effective printed region EF.

As the matrix arrangement of individual prints P does not (necessarily) match the ink zone subdivision (i.e. the length of each individual print P transversely to the direction of transport T of the sheet S is generally not an integer multiple of the ink zone width), this also means that the distribution of the relevant color control fields CF will differ from one ink zone to the other. This may for instance be appreciated by comparing the distribution of the color control fields CF in ink zone $Z_{i+1}$, where color control fields CF of the first and second color control patterns $CP_1$ and $CP_2$ are present, with that of the color control fields CF in ink zone $Z_{i+7}$ where only part of the color control fields CF of the third color control pattern $CP_3$ are present. As a consequence, it should also be appreciated that the relationship between the ink zone subdivision and the individual color control patterns (and associated color control fields) will typically differ from one column of prints P to the other.

Further details regarding the design of the color control pattern CP are discussed in European patent application No. 10187099.6 and will not be repeated here again.

Figure 4:
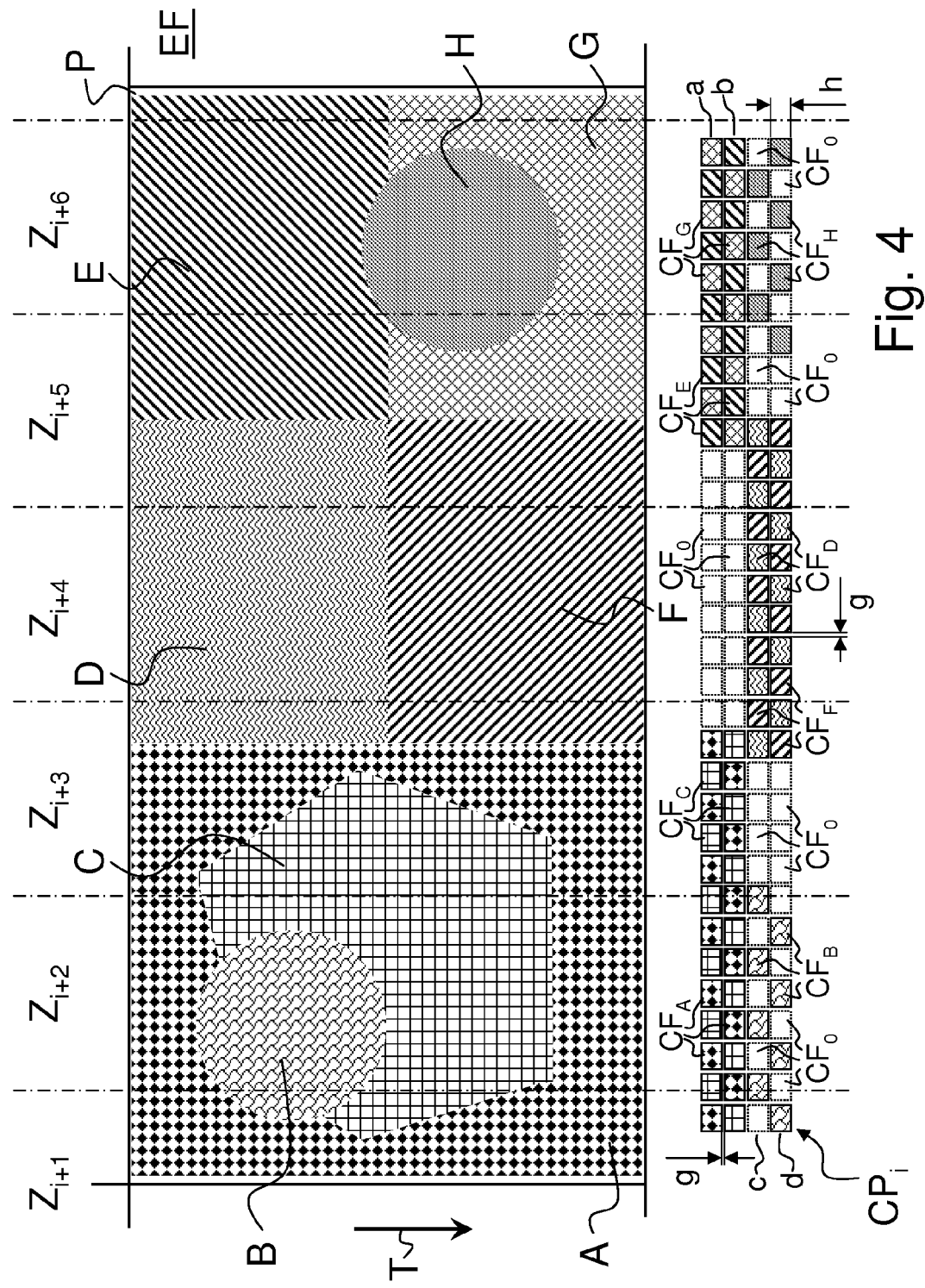
FIG. 4 is a schematic illustration of a possible design of the color control pattern according to European patent application No. 10187099.6 in the context of an illustrative and non-limiting example of a multicolor security print with a plurality of juxtaposed color areas of different colors.

FIG. 4 is a schematic illustration of a possible design of a color control pattern CP (or more exactly of the individual color control pattern $CP_i$) according to European patent application No. 10187099.6 in the context of an illustrative and non-limiting example of a multicolor security print P with a plurality of juxtaposed color areas of different colors A to H.

The illustration of FIG. 4 follows the same general design rules as in FIG. 3, i.e. the color control pattern $CP_i$ comprises four distinct color control strips a, b, c, d, each comprising a plurality of color control fields.

As schematically illustrated in FIG. 4, each individual print P of the matrix printed in the effective printed region EF comprises an identical multicolor printed image comprising a plurality of juxtaposed colored areas A to H printed with a corresponding plurality of printing inks of different colors. While eight different colored areas A to H are depicted, it should be appreciated that a lesser or greater number of different colored areas could be provided in practice.

While FIG. 4 may suggest that the entire surface of the each individual print P is covered with colored areas A to H, it should however be appreciated that portions of each individual print P may be left blank (such as in regions of the sheets provided with watermarks). The actual design of each individual print P and the corresponding distribution of the various colored areas will obviously be design-dependent and the example of FIG. 4 should not therefore be considered as limiting the scope of the invention and the applicability thereof.

As illustrated in the example of FIG. 4, color control fields $CF_A$ to $CF_H$ corresponding to each one of the relevant colors printed in areas A to H are suitably defined at relevant locations of the (individual) color control pattern $CP_i$. As already mentioned hereinabove, the relevant color control fields $CF_A$ to $CF_H$ are coordinated, as illustrated, to the actual usage of the relevant printing inks in the effective printed region EF (i.e. in each individual print P according to this preferred embodiment) and are positioned transversely to the direction of transport T of the sheet S at locations corresponding to actual positions where the relevant printing inks are applied.

In the illustrated example, the color control fields $CF_A$, $CF_B$ and $CF_C$ corresponding to areas A to C are concentrated on the left-hand side of the color control pattern $CP_i$ while the remaining color control fields $CF_D$ to $CF_H$ corresponding to areas D to H are located on the right-hand side of the color control pattern $CP_i$.

As shown in FIG. 4, the color control fields $CF_A$ to $CF_H$ are distributed between the various color control strips a-d in an alternate manner so as to provide room for all necessary color control fields. FIG. 4 shows unused/available color control fields $CF_O$ (which are depicted in dotted line) which could be exploited for the measurement of additional colors or, depending on the design, to allow for the provision of a greater number of different color control fields in any given portion of the color control pattern $CP_i$ transversely to the direction of transport T of the sheet S.

As illustrated in FIGS. 3 and 4, the color control fields preferably have a rectangular or square shape (even though other shapes, especially more complex shapes, are possible) with a minimum height h along the direction of transport T of the sheet S. In practice, a minimum height of the order of 3 mm is sufficient.

As further illustrated in FIGS. 3 and 4, it is advantageous to design the color control pattern in such a way that the color control fields are separated from one another by an unprinted gap. This favours a better recognition and identification of each individual color control field by an image processing system. This unprinted gap between the color control fields should preferably have a minimum width of the order of 0.4 mm (both along and transversely to direction T) to enable proper discrimination of the individual color control fields.

In FIG. 4, one has also depicted by dash lines a corresponding subdivision in a plurality of adjoining ink zones $Z_{i+1}$, $Z_{i+2}$, . . . , transversely to the direction of transport T of the sheet S. This particular ink zone subdivision corresponds to that shown in FIG. 3 in relation to the second color control pattern CP2. It is to be appreciated again that this ink zone subdivision will be different for the other columns of prints P.

The above-described color control pattern can be suitably used for performing color measurements, especially on printed sheets carrying multicolor security prints for the production of security documents, such as banknotes. Such color measurements can be carried out offline by means of device 1 of FIG. 1. In this case, and taking the example of FIG. 6 as a possible implementation, the multipurpose measuring apparatus 20 of device 1 would be used as an optical measurement system to carry out the measurements of the colors printed on a sample printed sheet S taken out of the delivery of the printing press 50 where the sheets are printed and the color measurements derived by the device 1 could be used to derive corresponding inking adjustments to control operation of the inking units of the printing press 50. In this case, adjustments would be carried out by inspecting and measuring both sides of the sample printed sheet S so that adjustment of the inking units on the front and reverse side can be carried out. In this way, one can build a complete closed-loop color control system for automatic ink control of the printing press.

Any suitable methodology for performing automatic ink control of the printing press can potentially be applied. A preferred methodology which can suitably be used is the one disclosed in International application No. WO 2007/110317 A1, which publication is discussed in the preamble hereof and is incorporated by reference in its entirety.

Reference will now be made to FIGS. 5a to 5m which are various views illustrating a possible graphical user interface (GUI) of the device 1 of FIG. 1 as embodied on the touch-screen display 30.

Figure 5A:
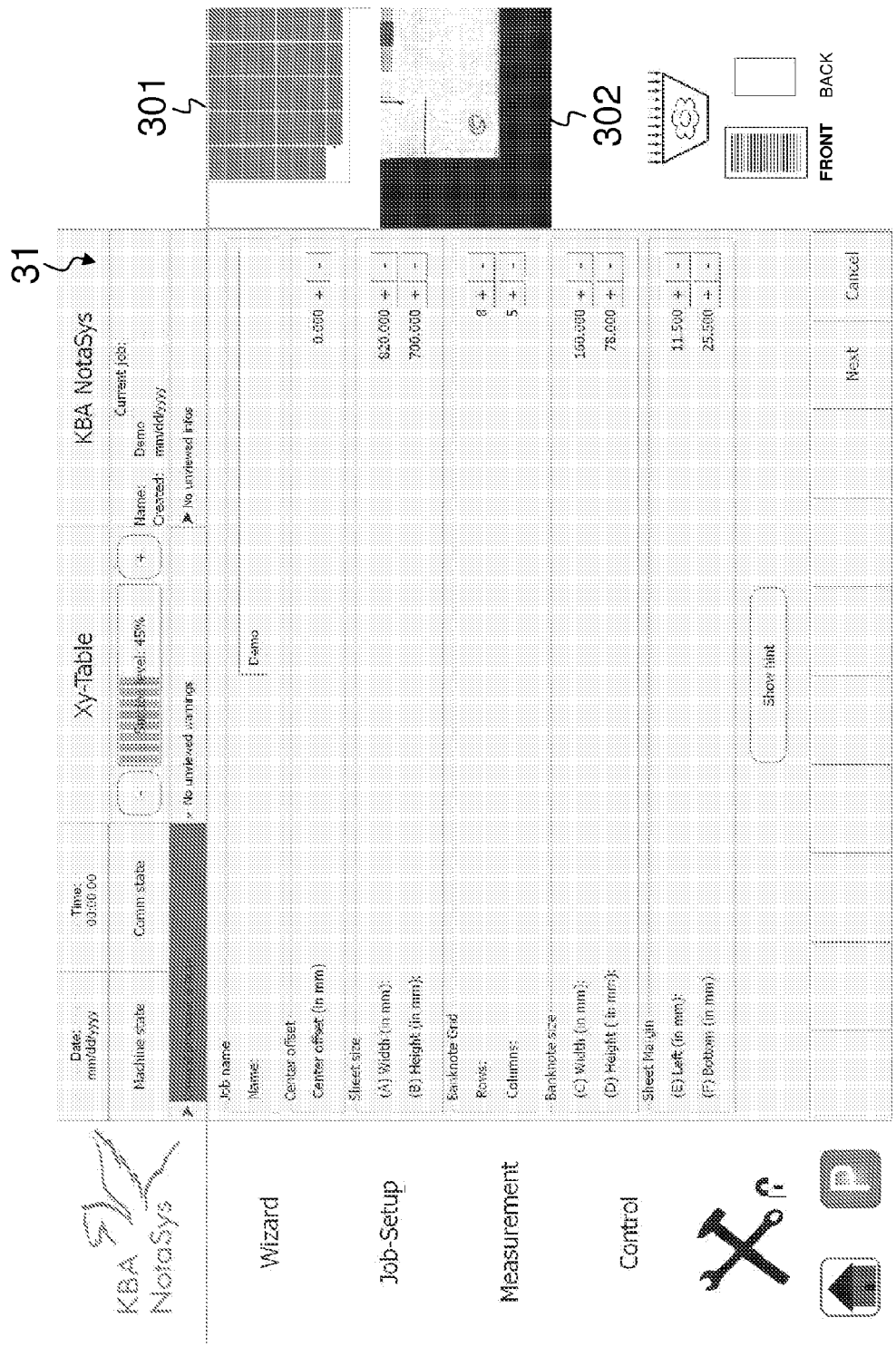

FIG. 5a shows a first view of the graphical user interface where a setup of device 1 is carried out. FIG. 5a essentially shows the touch-sensitive area 31 of the display 30 of FIG. 1, which is subdivided into various sub-areas. Areas 301 and 302 in FIG. 5a (also visible in FIGS. 5b to 5m) are touch-sensitive areas respectively showing a general layout of the sample printed sheet S (as defined based on setup data) and the current image captured by the camera 22.

In this particular example, setup data regarding the layout of the sample printed sheets S has been inputted to the control and processing unit 40 by means of the touch-screen display 30. Such setup data in particular includes a definition of the sheet size, of a banknote grid (i.e. the number of rows and columns of prints P in the effective region EF), a banknote size (i.e. the width and height of each print P), and the dimensions of the sheet margins measured at the bottom-left corner of the sample printed sheet S. These parameters allow the system to build a representative layout of the sample printed sheet S that is used to facilitate the positioning of the multi-purpose measuring apparatus 20 over the sample printed sheet S. The layout shown in area 301 is computed based on this setup data.

The "center offset" listed on the view of FIG. 5a allows the operator to define a possible offset of the sheet (transversely to the direction of transport of the sheet) in the printing press that was used to print the sheet, which offset has an impact on the relative distribution of the ink zones with respect to the impression on the sheet, and therefore on the relevant ink adjustments that may be carried out.

It is to be understood that the above setup data would be predefined by an operator when configuring the device 1 for a particular job. Such job definition includes the definition of further parameters of the sample printed sheet S, including a definition of the relevant color control pattern and color control fields to be used for color control purposes. Such job definition would be carried for both sides of the sample printed sheet S. The relevant job corresponding to the actual side of the sample printed sheet S is selected by the operator each time a new sheet is placed on the supporting surface.

Area 302 shows the current image that was captured by the camera 22. During an initialisation phase, when a new sample printed sheet S is put on the supporting surface 10a of the console 10 (and the vacuum system is activated), the camera automatically acquires a picture of the lower-left corner of the sample printed sheet S (which image of the lower left corner of the sample printed sheet S is visible in area 302 of FIG. 5a). This lower-left corner of the sample printed sheet S is schematically identified on the view of FIG. 5d and designated by reference PO. The image of area PO of the sample printed sheet S allows for an automatic determination of the position and/or rotation of the sample printed sheet S. In this way, the multipurpose measuring apparatus 20 and associated sensors 22, 23 can be properly and accurately positioned over and with respect to the sample printed sheet S.

The sample printed sheet S is normally aligned by way of its leading edge against the reference edge 10b of the table 100. This being said, a slight rotation of the sheet cannot be excluded as the sheet is put by hand on the supporting surface 10a. Advantageously, rotation of the sample printed sheet S within a certain tolerance can be compensated for by an adjustment of the y-position of the images taken by the camera 22 as the moveable sensor beam 200 moves along the x-axis.

Figure 5B:
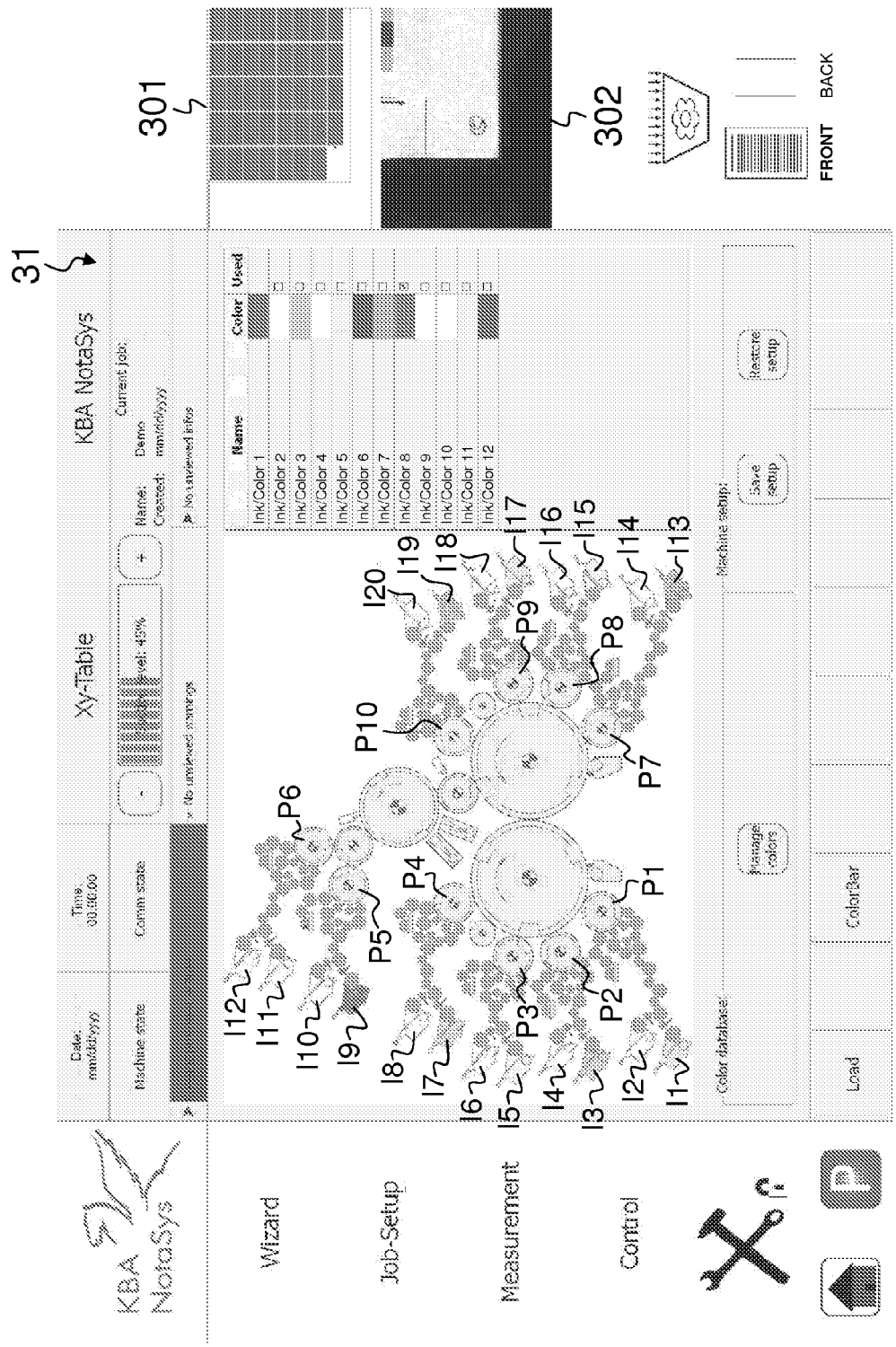

FIG. 5b shows another view of the graphical user interface where the relevant colors corresponding to the various inks applied on the sample printed sheet S (and in the color control fields CF) are predefined and inputted to the control and processing unit 40 during a setup phase. FIG. 5b shows a schematic illustration of the printing group of a Simultan-type offset security printing press which comprises six plate cylinders P1 to P6 for printing on the front side of the sheets and four plate cylinders P7 to P10 for printing on the back side of the sheets. An inking system is associated to each plate cylinder P1 to P10, each inking system comprising a pair of inking units (or ink fountains) designated by references I1 to I20 in FIG. 5b. The actual configuration of the printing press (and therefore the corresponding arrangement of the inking units) may differ from one press to another. By way of example, FIG. 6 shows a Simultan-type offset security printing press 50 for the simultaneous recto-verso printing of sheets which only comprises four plate cylinders and eight inking units for printing on the front side of the sheets.

The operator has the ability to predefine colors (so-called "defined colors") and to assign such defined colors to each inking unit I1-I20 of the printing press that was used to print the sample printed sheet S. In this way, the system can determine which inking unit would have to be adjusted in dependence of the color measurements carried out by device 1 on the sample printed sheet S.

Figure 5C:
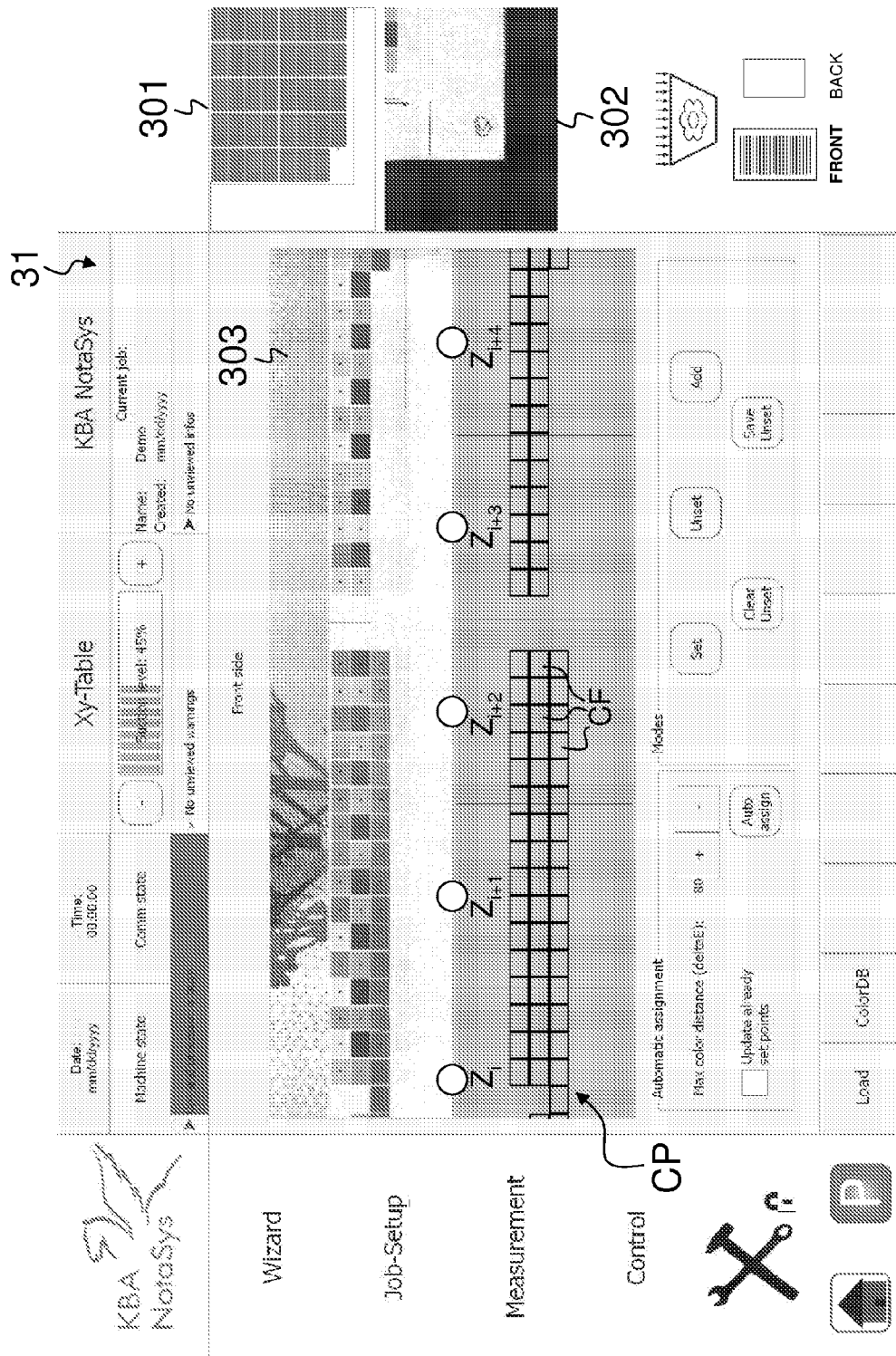

Preferably, as illustrated in FIG. 5c, the control and processing unit 40 is configured to control the camera 22 to automatically capture an image of the color control fields CF printed in the leading margin lm of the sample printed sheet S and identify the color control fields provided on the sample printed sheet S. This is schematically depicted in FIG. 5c where the upper part of touch-sensitive area 303 shows an image of (a portion of) the color control pattern CP and color control fields CF printed on the sample printed sheet S. The lower part of area 303 shows a corresponding distribution and identification of the color control fields CF, as detected by the system, and of the corresponding ink zone subdivision at the relevant portion of the sheet. The operator has the ability to move the image shown in area 303 by touching this area and moving it to the left or to the right.

The operator further has the ability to individually set and assign defined colors to each and every color control fields (i.e. to identify which color control field corresponds to which ink and which inking unit). Preferably, the control and processing unit 40 is configured to automatically assign the defined colors corresponding to the various inks applied on the sample printed sheet S to the corresponding color control fields CF. This can advantageously be carried out on the basis of pre-press data of the sample printed sheet S (which data already contains the necessary information regarding the relevant color control fields for each ink) or on the basis of measurements carried out in the color control fields CF by means of the multipurpose measuring apparatus (i.e. by way of the camera 22 and/or the color measurement sensor 23).

Once the necessary parameters of the relevant color control fields CF are defined in the system, accurate color measurements can be carried out by means of the color measurement sensor 23 in the color control fields CF that are actually printed on the sample printed sheet S. Advantageously, the control and processing unit 40 is configured to control the color measurement 23 to perform automated color measurements in the color control fields CF, i.e. by moving the color measurement sensor 23 over each color control field CF and deriving color measurements therefrom.

Figure 5D:
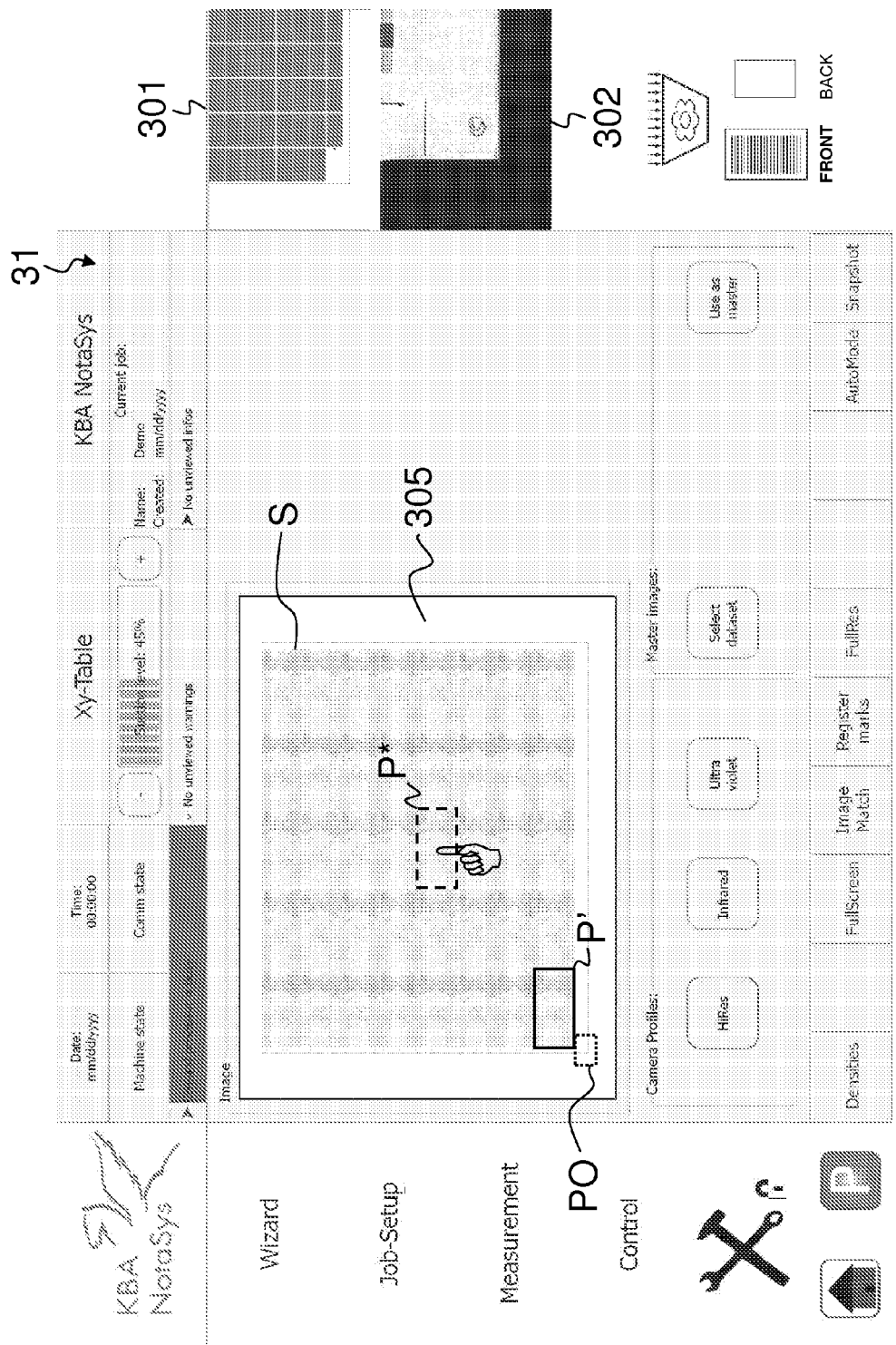

FIG. 5d shows yet another view of the graphical user interface where a representative image of the sample printed sheet S is presented in a touch-sensitive area 305 of the display 30. Reference P' in FIG. 5d designates the first individual print P (or banknote) at the lower left corner of the effective printed region EF of the sample printed sheet. An image of this area can automatically be captured by the camera 22 (and replicated to build the representative image of the sample printed sheet S shown in area 305 of FIG. 5d).

As schematically illustrated in FIG. 5d, the operator has the ability to select any desired one of the individual prints P in the representative image of the sample printed sheet S shown in area 305. FIG. 5d for instance shows an individual print, designated by reference P*, selected by hand in the touch-sensitive area 305. Upon selection of any individual print in touch-sensitive area 305, the control and processing unit 40 positions the moveable sensor beam 200 and the sensor head 21 over the desired location of the sample printed sheet S. In other words, the touch-sensitive area 31 of the display 30 is configured to act as input of the control and processing unit 40 for positioning of the moveable sensor beam 200 and of the sensor head 21 over the sample printed sheet S. More precisely, the control and processing unit 40 and the touch-sensitive area 31 of the display 30 are configured to allow quick positioning of the moveable sensor beam 200 and of the sensor head 21 on any desired one of the individual multicolor security prints P or any portion thereof.

Figure 5E:
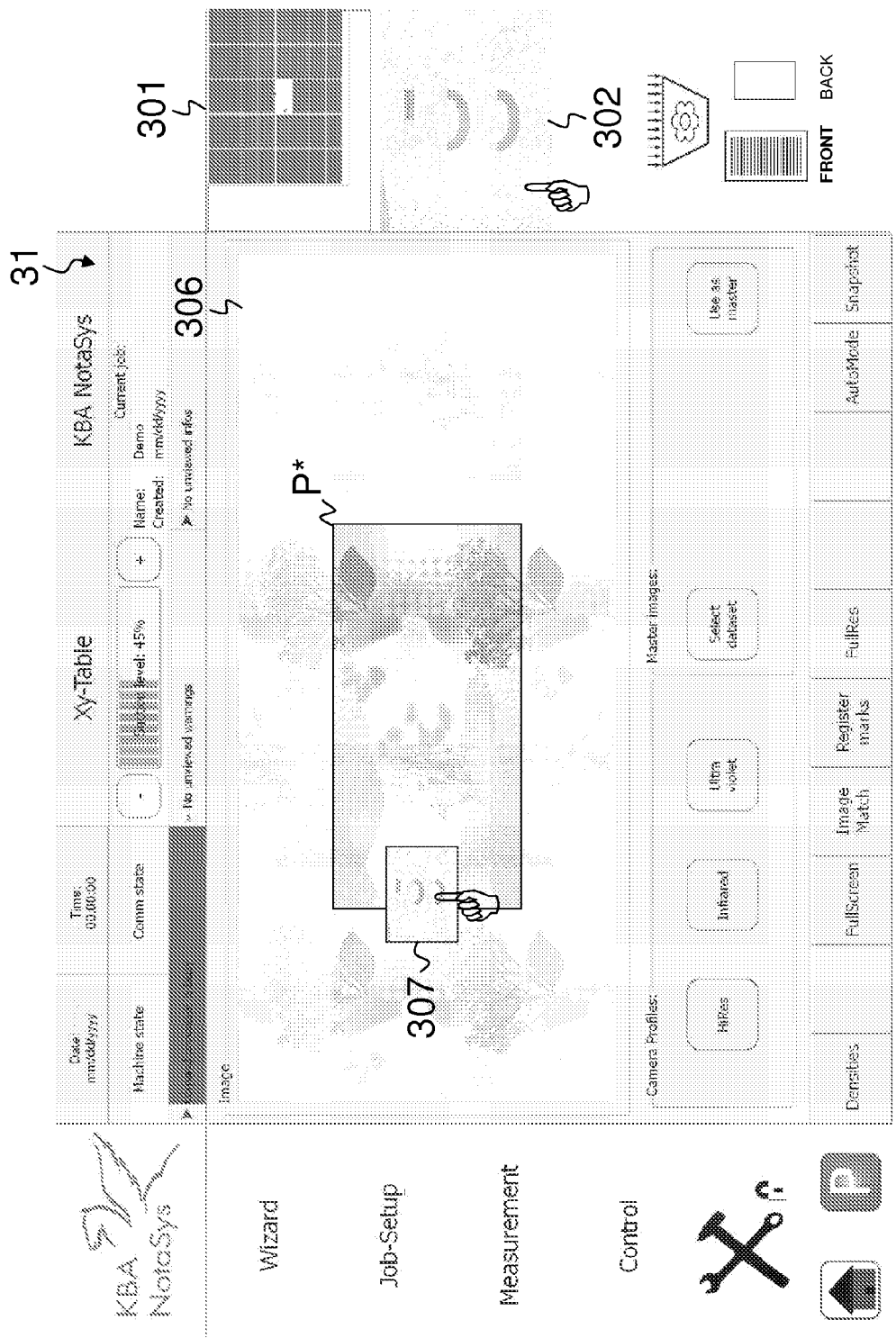

As shown in FIG. 5e, the relevant (banknote) position on the sheet selected by the operator is highlighted in area 301 and, upon selection of the individual print P*, the graphical user interface switches to another view where the relevant print is illustrated (touch-sensitive area 306 in FIG. 5e). Any desired portion of the individual print P* can be selected by touch in the touch-sensitive area 306, as depicted by area 307 in FIG. 5e, and an image of the desired portion is captured by the camera 22 and displayed in touch-sensitive area 302.

Figure 5F:
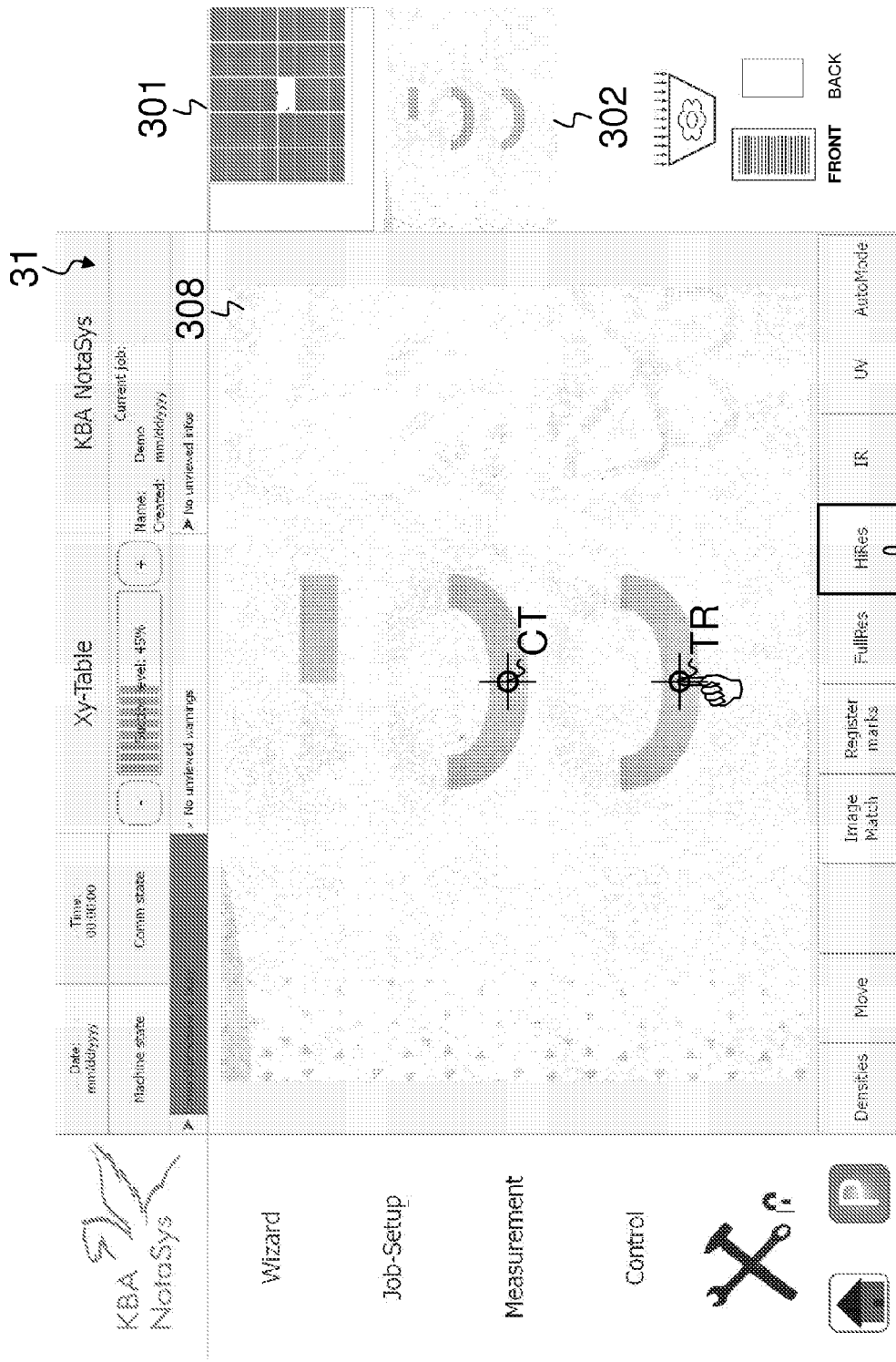

A finger touch in touch-sensitive area 302 automatically switches the graphical user interface to another view, as illustrated in FIG. 5f, where the selected portion of the sample printed sheet S is shown in greater detail. In this view, a touch-sensitive region 308 is provided within which the image of the selected portion of the sample printed sheet S is displayed in high resolution. This image is centred on the location, designated CT, that was indicated by the finger touch. The operator can easily move to another selected portion of the sample printed sheet S by touching the image in the touch sensitive region 308 at any desired location, as for instance indicated by reference TR. Upon selecting this new location TR, a new image is captured by the camera 22 and displayed in area 308, which new image has as centre location CT the selected location TR, as illustrated by FIG. 5g, the image in area 302 being updated accordingly.

Figure 5G:
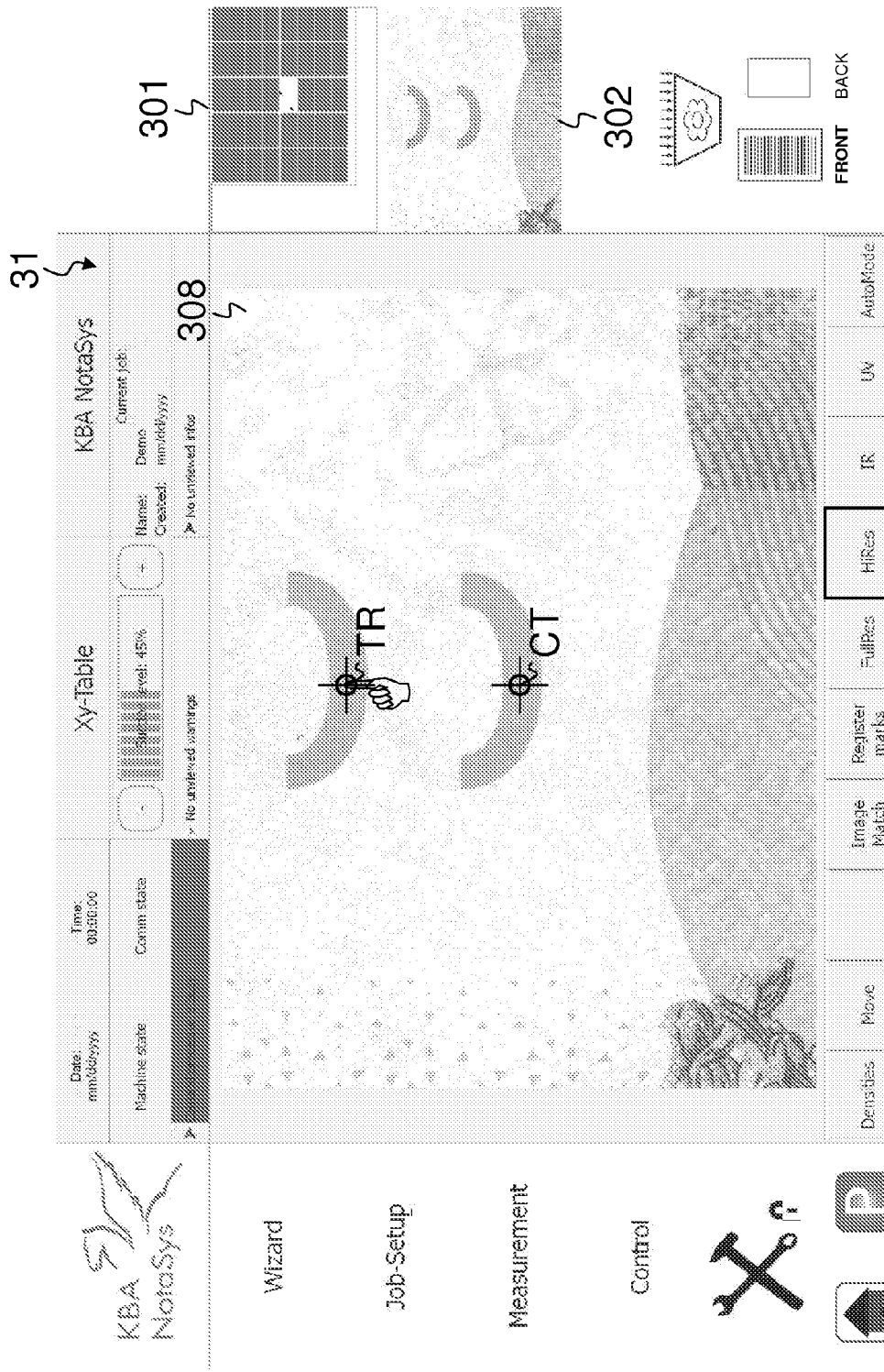

The views of FIGS. 5f and 5g show an image of a selected portion of the sample printed sheet S under white (visible) light. As already mentioned hereinabove, an operating mode of the camera 22 can, according to this preferred embodiment, be selectively switched between a visible light operating mode, an infrared operating mode and an ultraviolet operating mode.

Figure 5H:
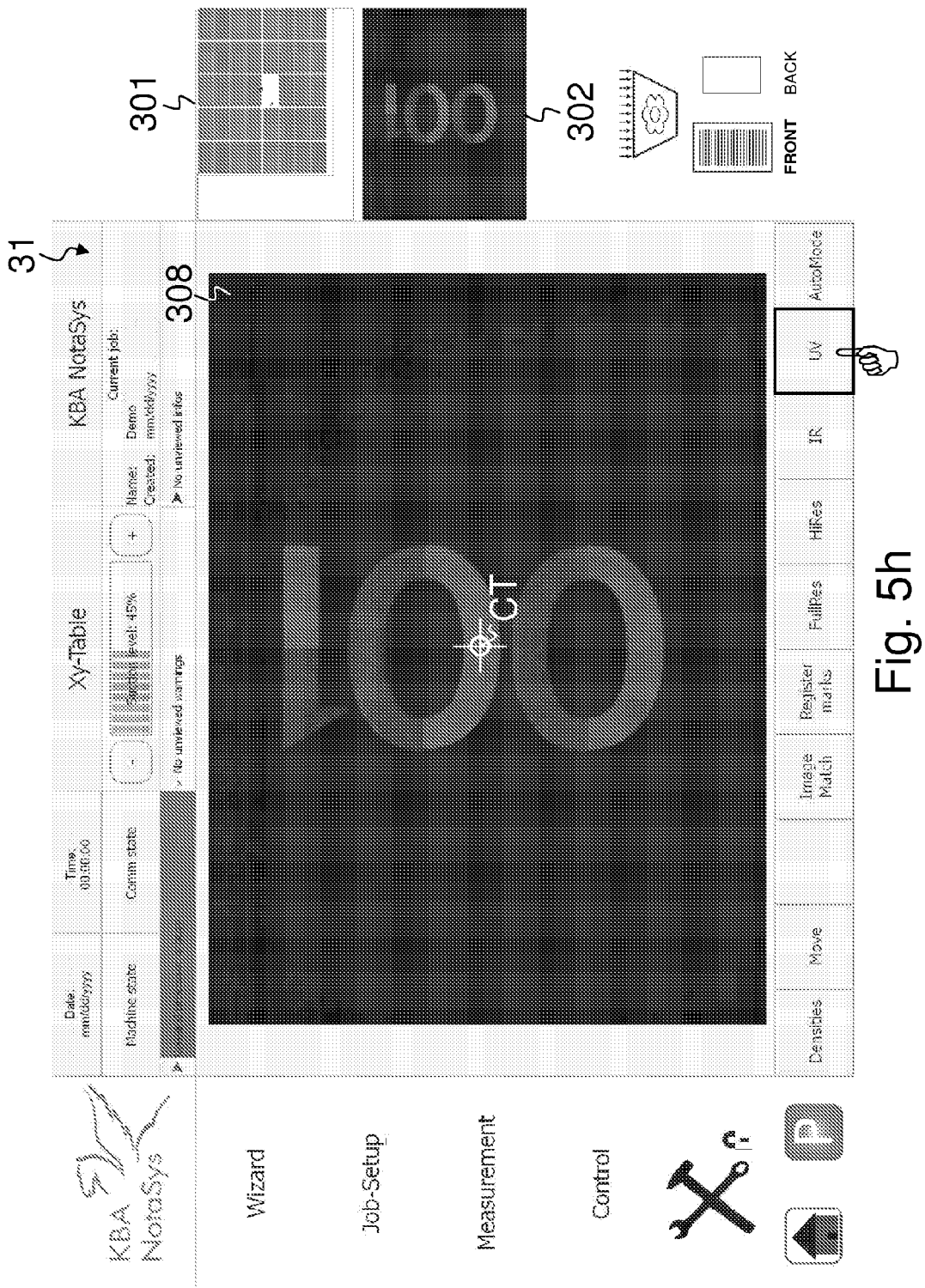

FIG. 5h for instance shows a view where the ultraviolet operating mode of the camera 22 has been activated in order to inspect UV-responsive features provided on the sample printed sheet. The image shown in FIG. 5h corresponds to the same location that is shown in FIG. 5f, with the difference that the third light source 26 for illuminating the sample printed sheet S with ultraviolet light was activated to reveal parts of the features shown in FIG. 5f that are not normally visible under white light.

Figure 5I:
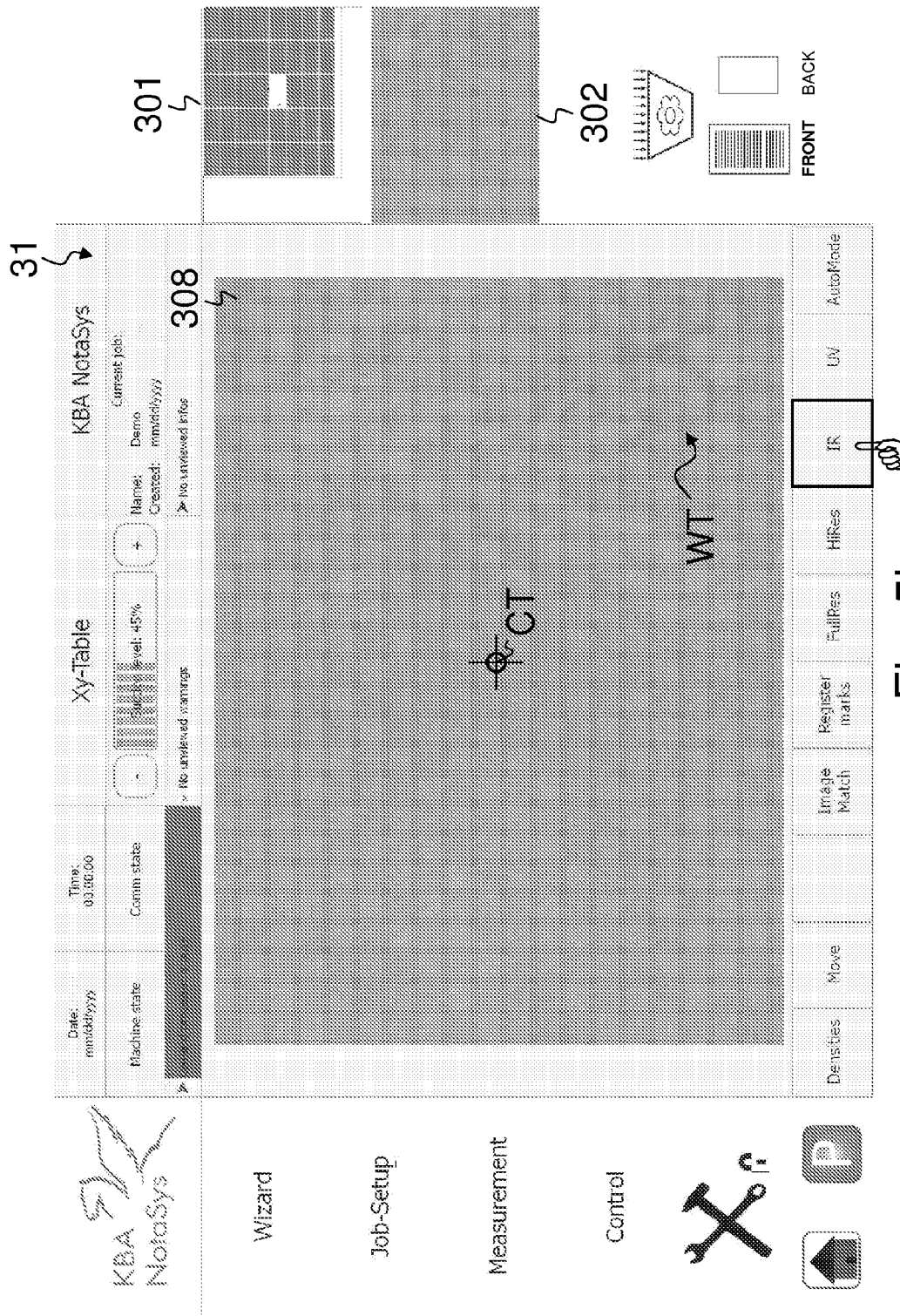

Similarly, FIG. 5i shows a view where the infrared operating mode of the camera 22 has been activated in order to inspect IR-absorbing features provided on the sample printed sheet. The image shown in FIG. 5i again corresponds to the same location that is shown in FIGS. 5f and 5h, with the difference that the second light source 25 for illuminating the sample printed sheet S with infrared light was activated. In this particular example, the printed features (which are made of inks which are not IR-absorbing) disappear. This infrared operating mode however allows the operator to reveals features such as watermarks WT (here depicting a butterfly) that are embedded in the substrate of the sheet.

Figure 5J:
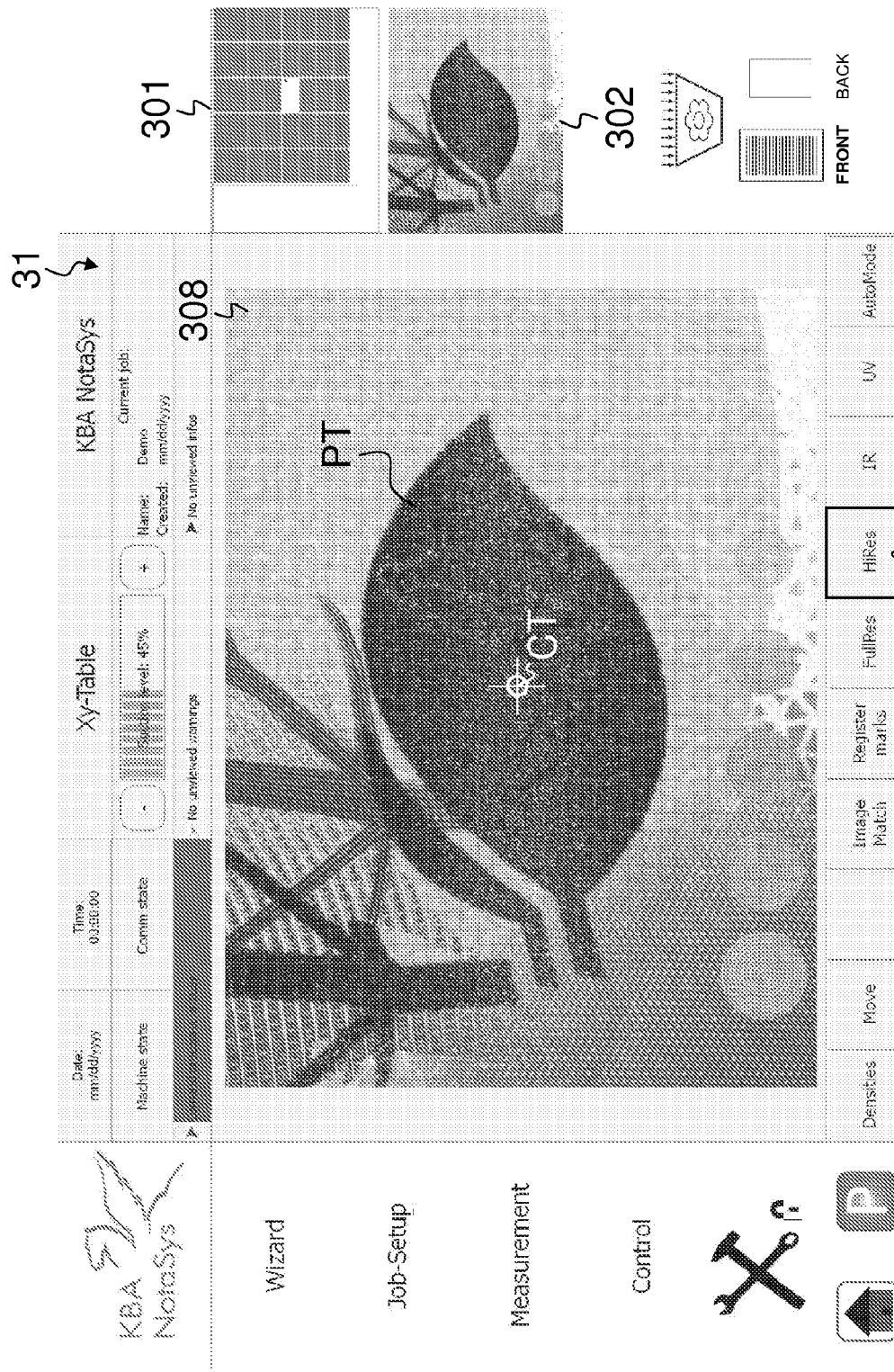
Figure 5K:
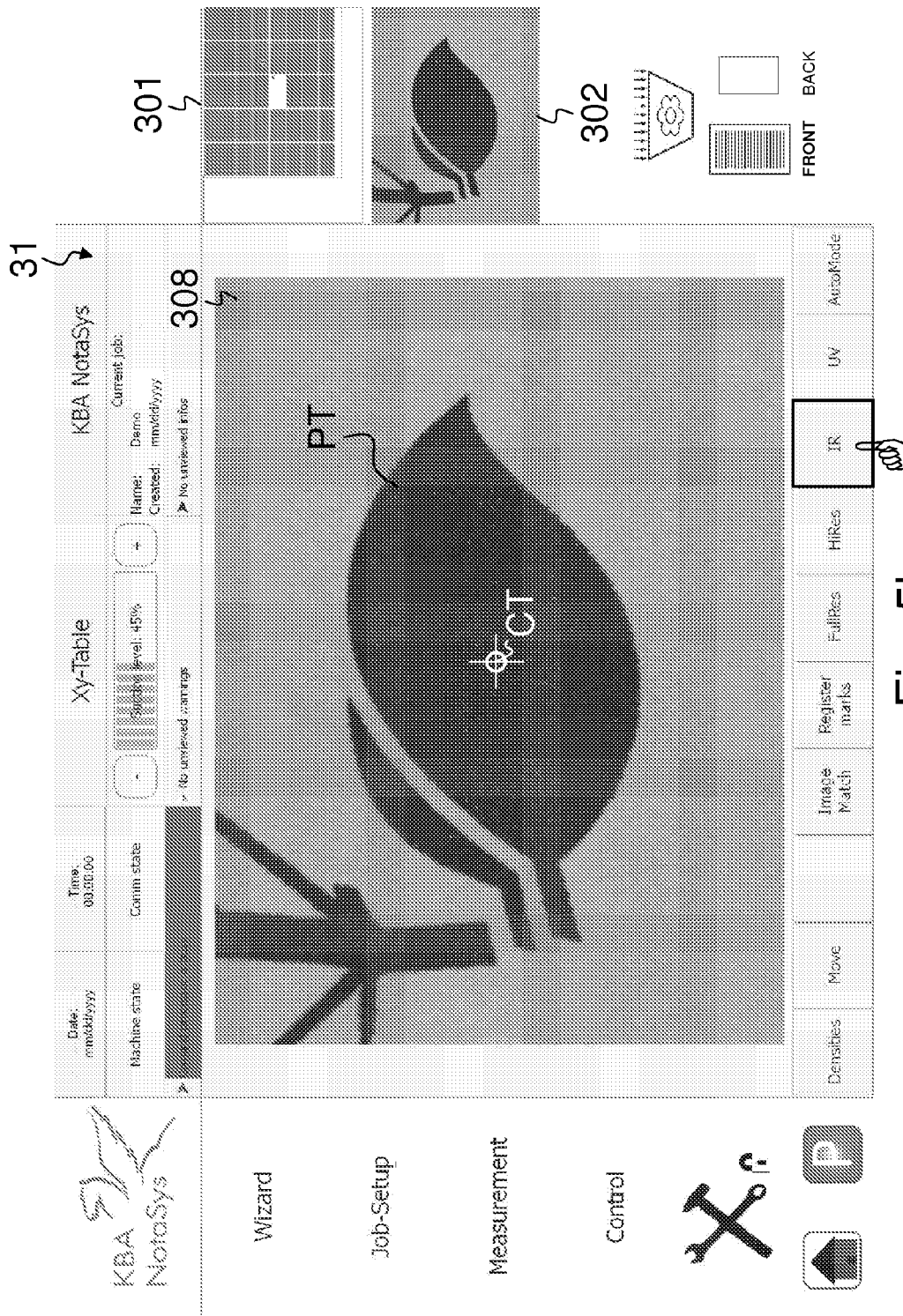
Figure 5I:
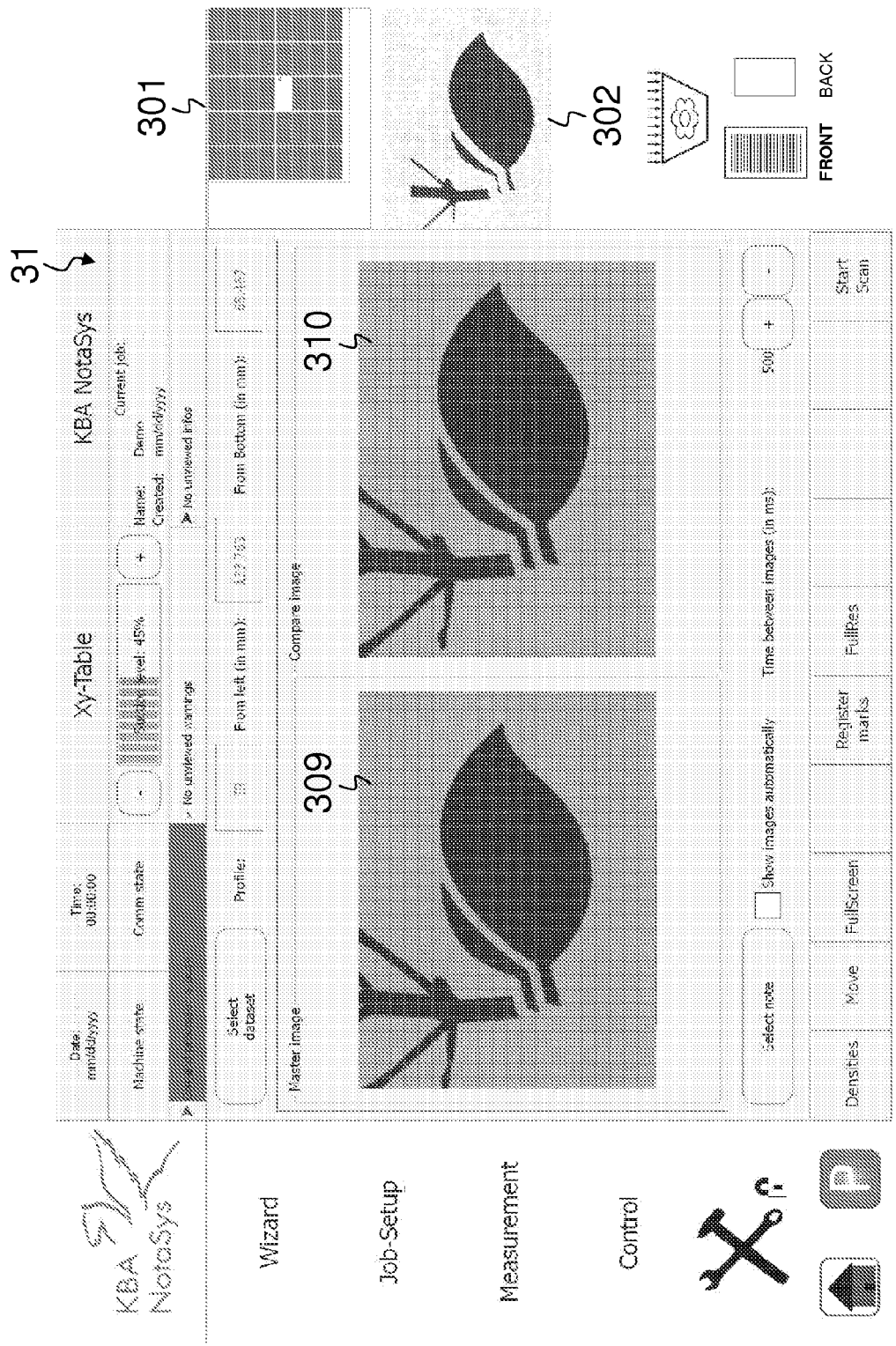

FIGS. 5*j* and 5*k* show two views of a different portion of the sample printed sheet S where an infrared-absorbing pattern PT is printed. FIG. 5*j* shows an image of the relevant portion of the sample printed sheet S under white (visible) light, while FIG. 5*k* shows an image of the same portion of the sample printed S under infrared light, revealing the infrared-absorbing properties of the pattern PT.

FIG. 5*l* illustrates another refinement of the preferred embodiment of the device 1 of the invention. As a further refinement, the device 1 may be configured to allow a visual comparison between a master (stored) image and corresponding images of the sample printed sheet. In this particular instance, a master image of the pattern PT shown in FIG. 5*k*, under infrared light, was stored. This master image is displayed in area 309. The relevant location of this master image (within the relevant print P) is stored and the device 1 is configured to automatically image all corresponding portions of the sample printed sheet S within all individual prints P, which images can be displayed in area 310. In this way, an operator can easily and quickly perform a visual comparison of the same or corresponding portions on each individual print P.

Figure 5M:
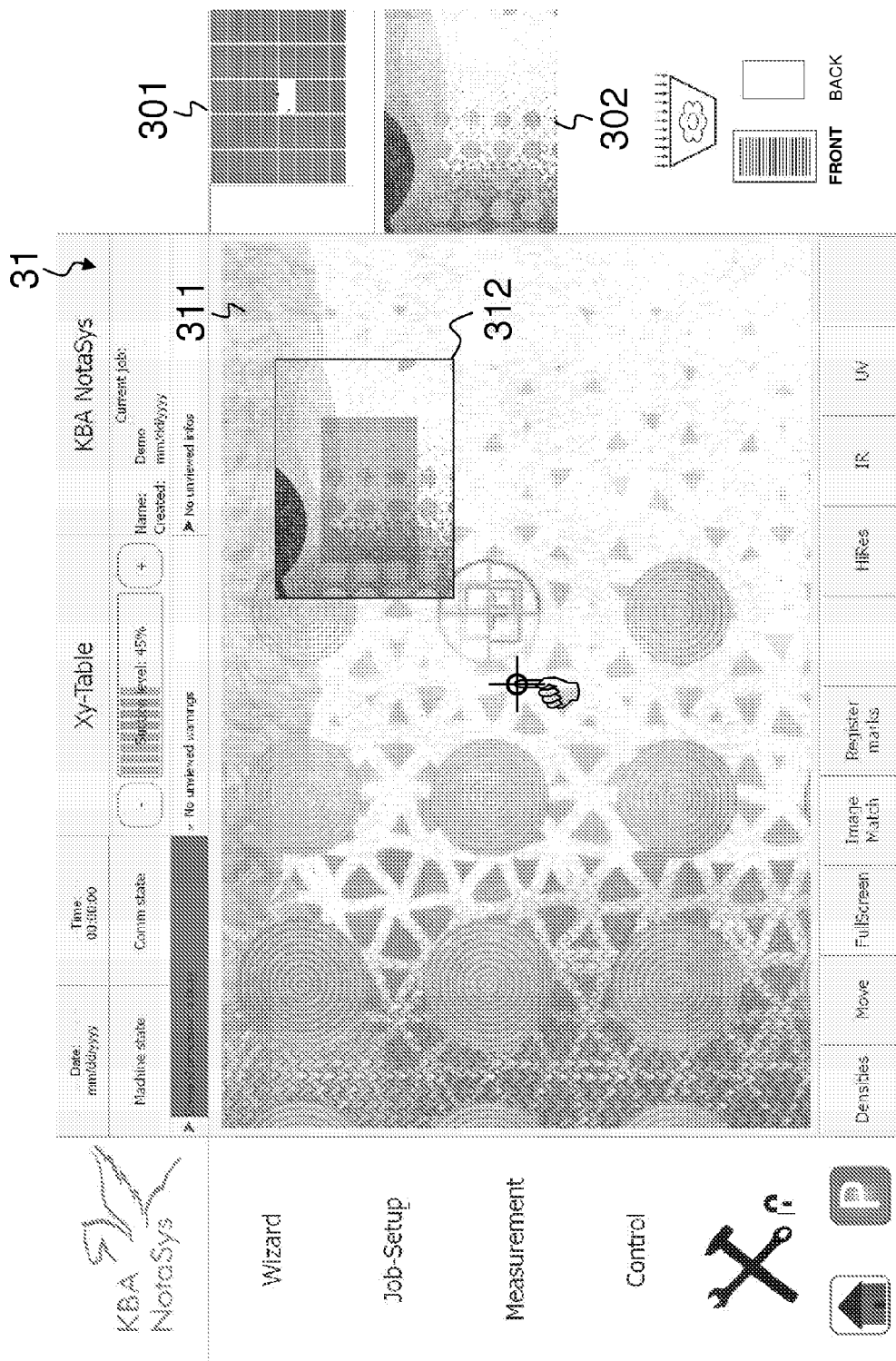

FIG. 5*m* shows another view of the graphical user interface where a selected sub-portion of the sample printed sheet S is displayed in full resolution, i.e. at a resolution which is higher than that of the images displayed for instance in FIGS. 5*f*, 5*g* and 5*j*. In this mode, the operator has the ability to perform an even more detailed inspection of any desired portion of the sample printed sheet S. More precisely, an image of the selected portion of the sample printed sheet, at a high resolution (lower than the full resolution), is displayed in area 302 as usual and the operator has the ability to examine a sub-portion of that image in full resolution, which sub-portion is displayed in touch-sensitive region 311. By touching region 311, an area 312 is displayed where the position of the relevant sub-portion, within the selected portion of the sample printed sheet S, is shown (as a darker rectangular area within area 312).

According to another refinement of the invention, the ability may be provided to the operator to display individually and separately on the display 30 each one of the color components of an image captured by the color camera 22. In the case of an RGB camera, separate displaying of the red, green and blue components of the image may help identifying features that are hardly distinguishable under visible light.

From a more general perspective, it will be appreciated that the touch-screen display 30 of the preferred embodiment is not only configured to act as input to the control and processing unit 40 for positioning of the moveable sensor beam 200 and of the sensor head 21 over the sample printed sheet S, but also to act as interface for controlling operation of the multipurpose measuring apparatus 20 and switching such apparatus between various operating modes, including at least one image acquisition mode where the camera 22 is activated to take images of selected portions of the sample printed sheet S and at least one color measuring mode where the color measurement sensor 23 is activated to perform measurements at selected locations on the sample printed sheet S.

Various modifications and/or improvements may be made to the above-described embodiments of the invention without departing from the scope of the invention as defined by the annexed claims.

LIST OF REFERENCES USED HEREIN

1 device for offline inspection and color measurements of printed sheets
10 console
10*a* supporting surface of console 10 onto which a sample printed sheet S to be inspected is placed
10*b* reference edge for supporting a leading edge of the sample printed sheet S
20 multipurpose measuring apparatus
21 sensor head of multipurpose measuring apparatus 20 (displaceable along a y-axis)
22 camera, especially color (e.g. RGB) camera
23 color measurement sensor for performing colorimetric and/or densitometric measurements at selected locations on the sample printed sheet S
24 first light source for illuminating the sample printed sheet S with white light
25 second light source for illuminating the sample printed sheet S with infrared (IR) light
26 third light source for illuminating the sample printed sheet S with ultraviolet (UV) light
27 sensor head drive for displacing the sensor head 21 along the y-axis
28 sensor beam drive for displacing the sensor beam 200 along the x-axis
30 display (touch-screen)
31 touch sensitive area of display 30
32 mounting arm of display 30
40 control and processing unit
50 printing press (e.g. Simultan-type offset printing press for the simultaneous recto-verso printing of sheets)
100 suction table
101 guiding rail for sensor beam 200 (rear side)
102 guide surface for sensor beam 200 (front side)
105 suction apertures
110 calibration pattern
200 sensor beam housing multipurpose measuring apparatus 20 (displaceable along the x-axis)
301 (touch-sensitive) area on display 30 showing the general layout of the sample printed sheet S
302 (touch-sensitive) area on display 30 showing the current image captured by the camera 22
303 (touch-sensitive) area on display 30 showing a portion of an image of the color control pattern CP captured by the camera 22 and of a corresponding identification and distribution of the corresponding color control fields CF
305 (touch-sensitive) area on display 30 showing a representative image of the sample printed sheet S
306 (touch-sensitive) area on display 30 showing a representative image of the selected individual print P*
307 (touch-sensitive) area within area 306 showing the selected portion of the sample printed sheet S
308 (touch-sensitive) area showing the selected portion of the sample printed sheet S (under white light, ultraviolet (UV) light or infrared (IR) light)
309 area showing master (stored) image of a selected portion of the sample printed sheet S
310 area showing the image of a portion of the sample printed sheet S corresponding to the master image shown in area 309

311 (touch-sensitive) area showing a selected sub-portion of the sample printed sheet in full resolution
312 touch-activated area showing the corresponding location within the selected portion of the sample printed sheet S of the sub-portion shown in area 311
S sample printed sheet
EF effective printed region of the sample printed sheet S
P individual (multicolor) prints (e.g. multicolor security prints)
P' individual print P at lower-left corner of the effective printed region EF
P* individual print P selected in touch-sensitive area 303
A-H juxtaposed colored areas printed with corresponding printing inks of different colors
T direction of transport of the printed sheet S in the printing press
tm trailing margin of the printed sheet (downstream of effective printed region EF)
lm leading margin of the printed sheet (upstream of effective printed region EF)
PO area of lower-left corner of the sample printed sheet S captured for the purpose of determining the position and/or rotation of the sample printed sheet S
CT centre of the image of the selected portion of the sample printed S shown in the touch-sensitive area 308
TR new (target) centre of the image of the new portion of the sample
printed S selected in the touch-sensitive area 308
CP color control pattern
$CP_i/CP_{1-5}$ individual color control pattern(s)
$CF/CF_{A-H}$ color control fields
$CF_0$ available/unused color control fields
a, b, c, d color control strips
$Z_{i+j}$ ink zones (j=0, 1, 2, 3, ... )
w width of unprinted region between individual color control patterns $CP_i/CP_{1-5}$ (transversely to direction of transport T)
h height of color control fields $CF/CF_{A-H}$ (along direction of transport T)
g gap (vertical & horizontal) between color control fields $CF/CF_{A-H}$
I1-I20 inking units of printing press
P1-P10 plate cylinders of printing press
WT watermark
PT printed infrared-absorbing pattern

The invention claimed is:

1. Device for offline inspection and color measurement of printed sheets for the production of banknotes and like printed securities, comprising:
 a console having a supporting surface for supporting a sample printed sheet;
 a multipurpose measuring apparatus, which multipurpose measuring apparatus comprises multiple sensors including at least one camera for taking images of selected portions of the sample printed sheet and a color measurement sensor for performing spectrophotometric, colorimetric, and/or densitometric measurements at selected locations on the sample printed sheet;
 a display for displaying the images taken by the camera and the measurements performed by the color measurement sensor; and
 a control and processing unit coupled to the multipurpose measuring apparatus and the display,
 wherein the device comprises a moveable sensor beam housing the multipurpose measuring apparatus, which moveable sensor beam is displaceable along an x-axis over the supporting surface of the console and over the entire surface of the sample printed sheet located on the supporting surface, the multiple sensors being mounted on a common sensor head which is displaceable within the moveable sensor beam along a y-axis so that the multipurpose measuring apparatus can selectively take images of selected portions of the sample printed sheet by means of the camera or perform measurements at selected locations on the sample printed sheet by means of the color measurement sensor,
 wherein the control and processing unit is configured to control displacement of the moveable sensor beam along the x-axis and of the sensor head along the y-axis
 wherein the camera is capable of taking images of selected portions of the sample printed sheet under white visible light, under infrared (IR) light, and under ultraviolet (UV) light, an operating mode of the camera being switchable selectively between a visible light operating mode, an infrared operating mode, and an ultraviolet operating mode,
 and wherein the multipurpose measuring apparatus further comprises multiple light sources which are activated individually in dependence of the operating mode of the camera, including a first light source for illuminating the sample printed sheet with white light, a second light source for illuminating the sample printed sheet with infrared (IR) light, and a third light source for illuminating the sample printed sheet with ultraviolet (UV) light.

2. Device according to claim 1, wherein the moveable sensor beam forms a longitudinal arm that is located in close proximity to the supporting surface, a spacing between the moveable sensor beam and the supporting surface being of a couple of millimeters,
 and wherein the sensor head and multiple sensors are completely encased within the moveable sensor beam so as to leave only a lower opening in the moveable sensor beam which is oriented towards the supporting surface and the sample printed sheet located thereon.

3. Device according to claim 1, wherein the display is a touch-screen display with a touch-sensitive area configured to act as input of the control and processing unit for positioning of the moveable sensor beam and of the sensor head over the sample printed sheet.

4. Device according to claim 3 designed to inspect a sample printed sheet exhibiting an effective printed region consisting of a matrix of individual multicolor security prints arranged in multiple rows and columns,
 wherein the control and processing unit and the touch-sensitive area of the display are configured to allow positioning of the moveable sensor beam and of the sensor head on any desired one of the individual multicolor security prints or any portion thereof upon selection on the touch-screen display.

5. Device according to claim 3, wherein the touch-screen display is further configured to act as interface for controlling operation of the multipurpose measuring apparatus and switching the multipurpose measuring apparatus between various operating modes, including at least one image acquisition mode where the camera is activated to take images of selected portions of the sample printed sheet and at least one color measuring mode where the color measurement sensor is activated to perform measurements at selected locations on the sample printed sheet.

6. Device according to claim 1, wherein the camera is a color camera and wherein each one of the color components of an image captured by the camera can optionally be displayed individually and separately on the display.

7. Device according to claim 1, wherein images of the selected portions of the sample printed sheet on the display can be switched between at least two different resolution modes.

8. Device according to claim 1, wherein a position and/or a rotation of the sample printed sheet is determined automatically during an initialisation phase by means of the camera.

9. Device according to claim 8, wherein rotation of the sample printed sheet within a certain tolerance is compensated for by an adjustment of the y-position of the images taken by the camera as the moveable sensor beam moves along the x-axis.

10. Device according to claim 1 designed to inspect a sample printed sheet exhibiting an effective printed region consisting of a matrix of individual multicolor security prints arranged in multiple rows and columns,
   wherein the sample printed sheet further exhibits a color control pattern printed in a margin portion of the sample printed sheet next to the effective printed region, which color control pattern comprises an individual color control pattern for each column of individual multicolor security prints,
   and wherein the control and processing unit is configured to control the camera to automatically scan and take an image of each individual color control pattern.

11. Device according to claim 1, wherein the control and processing unit is configured to control the camera to automatically capture an image of and identify color control fields provided on the sample printed sheet, which color control fields are indicative of the various inks applied on the sample printed sheet during printing.

12. Device according to claim 11, wherein the control and processing unit is configured to control the color measurement sensor to perform automated color measurements in the color control fields.

13. Device according to claim 1, wherein the control and processing unit is configured to control the color measurement sensor to perform color measurements in color control fields that are provided on the sample printed sheet, which color control fields are indicative of the various inks applied on the sample printed sheet during printing and wherein defined colors corresponding to the various inks applied on the sample printed sheet and in the color control fields are predefined and inputted to the control and processing unit, during a setup phase, and are assigned to corresponding inking units of the printing press that was used to print the sample printed sheet (S).

14. Device according to claim 13, wherein the control and processing unit is configured to automatically assign the defined colors to corresponding color control fields based on pre-press data of the sample printed sheet or based on measurements carried out in the color control fields by means of the multipurpose measuring apparatus.

15. Device according to claim 1, wherein the console comprises a suction table with a plurality of suction apertures to hold the sample printed sheet against the supporting surface by aspiration.

16. Device according to claim 1, wherein at least one calibration pattern is provided on the supporting surface for calibration of the multiple sensors of the multipurpose measuring apparatus.

17. Device according to claim 1, wherein the color measurement sensor combines a spectrophotometer or spectrocolorimeter for performing spectrophotometric or colorimetric measurements and a densitometer for performing optical density measurements on the sample printed sheet.

* * * * *